(12) United States Patent
Takada et al.

(10) Patent No.: US 11,221,420 B2
(45) Date of Patent: Jan. 11, 2022

(54) DETECTION ELEMENT, RADIATION DETECTION DEVICE, AND COMPTON CAMERA

(71) Applicants: KYOTO UNIVERSITY, Kyoto (JP); DAI NIPPON PRINTING CO., LTD., Tokyo (JP)

(72) Inventors: Atsushi Takada, Kyoto (JP); Toru Tanimori, Kyoto (JP); Kohei Ota, Tokyo (JP); Tomohisa Motomura, Tokyo (JP); Ryoichi Ohigashi, Tokyo (JP); Osamu Shimada, Tokyo (JP)

(73) Assignees: KYOTO UNIVERSITY, Kyoto (JP); DAI NIPPON PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/193,527

(22) Filed: Mar. 5, 2021

(65) Prior Publication Data

US 2021/0208291 A1 Jul. 8, 2021

Related U.S. Application Data

(63) Continuation of application No. PCT/JP2019/035867, filed on Sep. 12, 2019.

(30) Foreign Application Priority Data

Sep. 13, 2018 (JP) .............................. JP2018-171646

(51) Int. Cl.
*G01T 1/17* (2006.01)
*G01T 7/00* (2006.01)
(Continued)

(52) U.S. Cl.
CPC ................ *G01T 1/18* (2013.01); *H01J 47/06* (2013.01)

(58) Field of Classification Search
CPC . H01J 1/304; H01J 47/06; H01J 19/02; G01T 1/18; G01T 1/241; G01T 1/29; G01T 1/02; G01T 7/00
See application file for complete search history.

(56) References Cited

U.S. PATENT DOCUMENTS 9,779,906 B2 * 10/2017 Ishikawa .................. H01J 1/35
2002/0134945 A1 9/2002 Tanimori et al.
(Continued)

FOREIGN PATENT DOCUMENTS

JP 2002-006047 A 1/2002
JP 2007-520865 A 7/2007
(Continued)

OTHER PUBLICATIONS

Translation of Dec. 3, 2019 Written Opinion issued in International Patent Application No. PCT/JP2019/035867.
(Continued)

*Primary Examiner* — David P Porta
*Assistant Examiner* — Fani Boosalis
(74) *Attorney, Agent, or Firm* — Oliff PLC

(57) ABSTRACT

A detection element includes an exposed electrode on the first surface of an insulating substrate, the exposed electrode including first exposed electrode, second exposed electrode, third exposed electrode, and fourth exposed electrode provided; a first electrode pattern provided on a side opposite to the first surface, the first electrode pattern including a pattern connected to the first exposed electrode and the second exposed electrode, a pattern connected to the third exposed electrode and the fourth exposed electrode, a second electrode pattern having a first exposed portion and a pattern provided along the second direction, and a third electrode pattern having a second exposed portion and a pattern provided along the third direction, provided so as to sand- (Continued)

wich the third electrode pattern between the first electrode pattern and the second electrode pattern.

16 Claims, 39 Drawing Sheets

(51) Int. Cl.
  *H01J 47/06* (2006.01)
  *G01T 1/18* (2006.01)

(56) References Cited

U.S. PATENT DOCUMENTS

2008/0251732 A1   10/2008  Dick et al.
2011/0133071 A1*  6/2011   Bashkirov ................ G01T 1/16
                                                         250/282

FOREIGN PATENT DOCUMENTS

JP    2008-243634 A   10/2008
JP    2013-506850 A   2/2013
WO    2017/077942 A1  5/2017

OTHER PUBLICATIONS

Dec. 3, 2019 International Search Report issued in International Patent Application No. PCT/JP2019/035867.
Dec. 3, 2019 Written Opinion issued in International Patent Application No. PCT/JP2019/035867.

* cited by examiner

DETECTION ELEMENT, RADIATION DETECTION DEVICE, AND COMPTON CAMERA

CROSS REFERENCE TO RELATED APPLICATIONS

This application is based upon and claims the benefit of priority from the prior Japanese Patent Application No. 2018-171646, filed on Sep. 13, 2018, and PCT Application No. PCT/JP2019/035867 filed on Sep. 12, 2019, the entire contents of which are incorporated herein by reference.

FIELD

The present disclosure relates to a detection element, a radiation detection device, and a compton camera.

BACKGROUND

Research on a radiation detection device of the gas electron amplification type by a pixel-type electrode is proceeding. Such a radiation detection device detects radiation by using the pixel-type electrode. At this time, a track of charged particles can be detected (for example, Japanese Unexamined Patent Application Publication No. 2002-6047). The radiation detection device using this technique is used as an imaging device for nuclear medicine to diagnose and treat diseases using a medicine (radioisotope) as a mark, which emits very small amounts of radiation, such as PET (Positron Emission Tomography) examination and SPECT (Single Photon Emission Computed Tomography) examinations. In other fields, this technique is expected to be applied as a device for monitoring radiation dose in the environment.

SUMMARY

According to an embodiment of the present disclosure, there is provided a detection element including a plurality of exposed electrodes exposed on first surface side of an insulating substrate, the plurality of exposed electrodes includes a first exposed electrode, a second exposed electrode provided in first direction with respect to the first exposed electrode, a third exposed electrode provided in second direction intersecting the first direction with respect to the first exposed electrode, and a fourth exposed electrode provided in the second direction with respect to the second exposed electrode and in the first direction with respect to the third exposed electrode; a first electrode pattern provided on second surface side opposite the first surface side of the insulating substrate, the first electrode pattern including at least a pattern connected to the first exposed electrode and the second exposed electrode by the first through electrode, and a pattern connected to the third exposed electrode and the fourth exposed electrode by the second through electrode; a second electrode pattern including a first exposed portion, the second electrode pattern including at least a pattern provided along the second direction corresponding to the first exposed electrode and the third exposed electrode, and a pattern provided along the second direction corresponding to the second exposed electrode and the fourth exposed electrode, and the first exposed portion exposed on the first surface side and provided separately the exposed electrode; and a third electrode pattern having a second exposed portion, the third electrode pattern including at least a pattern provided along the third direction connecting the first exposed electrode and the fourth exposed electrode, and provided so as to sandwich the third electrode pattern between the first electrode pattern and the second electrode pattern, the second exposed portion exposed on the first surface side and provided separately from the exposed electrode and the second electrode pattern.

In the detection element, the second electrode pattern may have a first opening surrounding one of the exposed electrodes, the third electrode pattern may have a second opening surrounding one of the exposed electrodes, and the width of the first opening may be greater than the width of the second opening.

In the detection element, the second exposed portion of the third electrode pattern may be provided on the same layer as the second electrode pattern.

In the detection element, the exposed electrode may be provided on the same layer as the second electrode pattern.

In the detection element, at least one of the first electrode pattern, the second electrode pattern, and the third electrode pattern may be electrically connected in an area surrounding the first exposed electrode, the second exposed electrode, and the fourth exposed electrode.

The detection element may include an insulating layer on the first electrode pattern on the second surface side.

In the detection element, the first exposed electrode and the second exposed electrode may be provided adjacent to each other, the first exposed electrode and the third exposed electrode may be provided adjacent to each other, and the first exposed electrode and the fourth exposed electrode may be provided adjacent to each other.

In the detection element, the distance between the first exposed electrode and the second exposed electrode, the distance between the first exposed electrode and the third exposed electrode, and the distance between the first exposed electrode and the fourth exposed electrode may be equal.

In the detection element, when providing a first virtual line connecting the first exposed electrode and the third exposed electrode is provided in the second electrode pattern, a distance between a center of the first exposed electrode and the first intersection point where a second virtual line passing through the center of the first exposed electrode and being orthogonal to the first virtual line intersects an edge of the second electrode pattern may be greater than a distance between the midpoint between the first exposed electrode and the third exposed electrode, and the second intersection point where the third virtual line passing through the midpoint and being orthogonal to the first virtual line intersects the edge of the second electrode pattern.

In the detection element, the second electrode pattern may have a wavy edge.

In the detection element, the exposed electrode may further include a fourth electrode pattern having a third exposed portion, the fourth electrode pattern is provided along the fourth direction corresponding to the first exposed electrode and the fifth exposed electrode, and includes at least a pattern provided so as to sandwich the fourth electrode pattern between the second electrode pattern and the third electrode pattern, the exposed electrode further includes a fifth exposed electrode passes through the second exposed electrode and provided in a fourth direction passing between the first exposed electrode and the fourth exposed electrode, and the third exposed portion further includes a fourth electrode pattern exposed on the first surface side and provided separately from the exposed electrode, the second electrode pattern, and the third electrode pattern.

In the detection element, the third electrode pattern includes a first annular pattern surrounding the first exposed electrode, a second annular pattern surrounding the fourth exposed electrode, and a connection pattern connecting the first annular pattern and the second annular pattern, a width of the connection pattern may be narrower than an outer peripheral width of the first annular pattern and the outer peripheral width of the second annular pattern.

In the detection element, the third electrode pattern is provided on an insulating surface, the insulating surface has a recess, the exposed electrode is provided in the recess, and the distance from the surface of the recess to the top surface of the exposed electrode may be greater than the distance from the insulating surface to the top of the third electrode pattern.

According to an embodiment of the present disclosure, there is provided a radiation detection device including the detection element, and a power supply device connected to the exposed electrode, the first electrode pattern, the second electrode pattern and the third electrode pattern of the detection element.

In the radiation detection device, the potential difference between the potential of the exposed electrode and the potential of the second electrode pattern applied by the power supply device may be greater than the potential difference between the potential of the exposed electrode and the potential of the third electrode pattern applied by the power supply device.

According to an embodiment of the present disclosure, there is provided a Compton camera including a radiation detection device and a detection module for detecting light so as to surround the radiation detection device.

According to an embodiment of the present disclosure, it is possible to improve the detection efficiency and the detection accuracy of radiation in the radiation detection device.

DESCRIPTION OF EMBODIMENT

Figure 1:
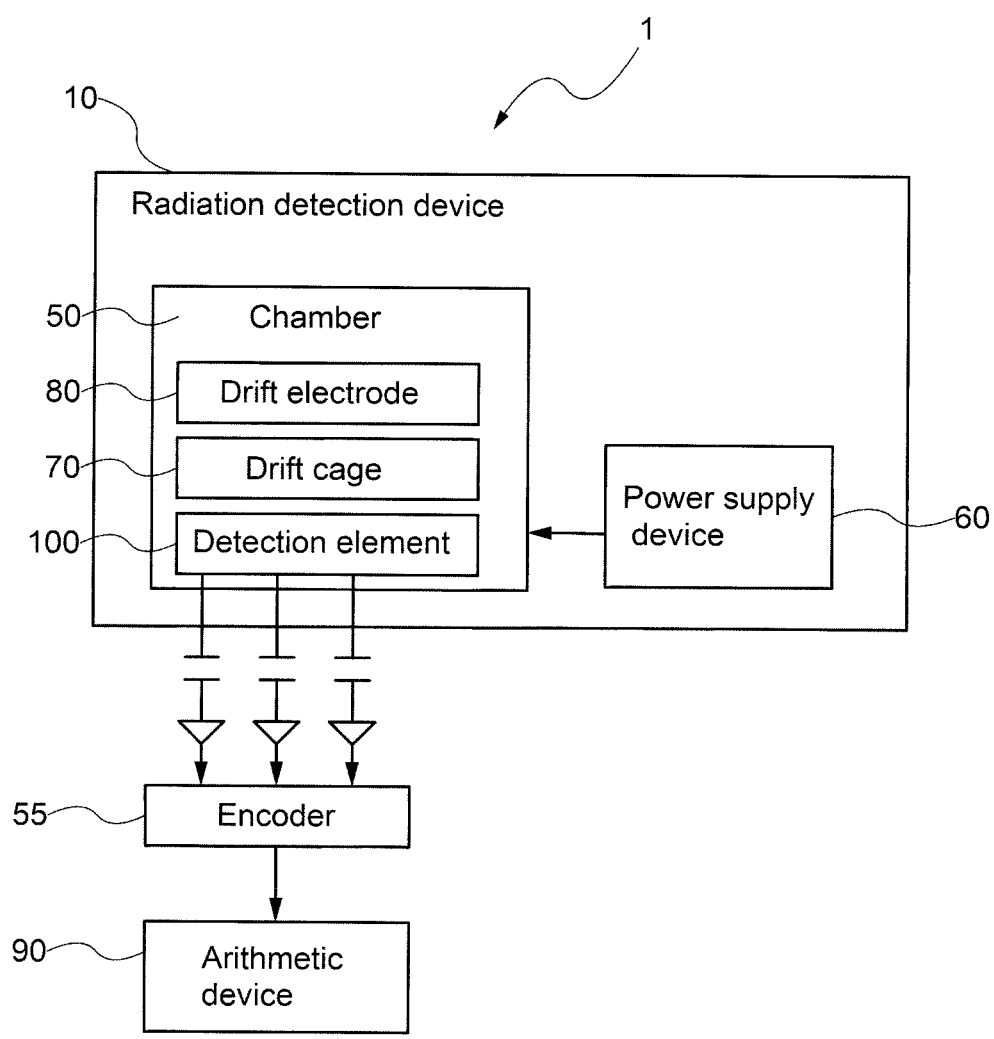
FIG. 1 is a block diagram showing a configuration of a radiation detection system according to the first embodiment of the present disclosure.

Hereinafter, a radiation detection device according to an embodiment of the present disclosure will be described in detail referring to the drawings. The following embodiments are examples of embodiments of the present disclosure, and the present disclosure is not to be construed as being limited to these embodiments. In the drawings referred to in the present embodiments, the same portions or portions having similar functions are denoted by the identical symbols or similar symbols (symbols each formed simply by adding A, B, etc. to the end of a number), and a repetitive description thereof may be omitted. For convenience of description, the dimensional ratio of the drawings (the ratio between the components, the ratio in the vertical and horizontal directions, etc.) may be different from the actual ratio, or a part of the configuration may be omitted from the drawings.

According to the radiation detection device disclosed in Patent Literature 1, radiation (charged particles) interacts with gas to generate electron, and the electron is captured by a pixel-type electrode. Thereby, the radiation is indirectly detected. However, when many electrons occur, the electrons may be captured at the same time by a plurality of pixel-type electrodes. In such a case, it is impossible to identify the pixel-type electrode which captured electrons, which has led to a decrease in detection efficiency and detection accuracy.

It is an object of the present disclosure to improve the detection efficiency and the detection accuracy of radiation in a radiation detection device.

First Embodiment

[Radiation Detection System]

FIG. 1 is a block diagram showing a configuration of a radiation detection system according to the first embodiment of the present disclosure. A radiation detection system 1 includes a radiation detection device 10 having a power supply device 60 and a detection element 100, an encoder 55, and an arithmetic device 90. The detection element 100 outputs detection signals Sx, Sy, Sw. In the detection signals Sx, Sy, and Sw, in this example, a direct current component is removed by a condenser based on electric signals output from respective terminals of the detection device 100, and the detection signals Sx, Sy, and Sw are amplified by the amplifiers. The power supply device 60 applies a voltage to the respective configurations (the detection element 100, etc.) included in the radiation detection device 10. The encoder 55 samples, encode and outputs the detection signals Sx, Sy, Sw in synchronization with a clock signal Ck. The resolution of the detection signal is determined by the clock signal Ck. This output signal may be referred to as Sd. The arithmetic device 90 calculates a track of radiation (charged particles) based on the output signal Sd.

[Radiation Detection Device]

The radiation detection device 10 has a chamber 50. The detection element 100, a drift cage 70 and a drift electrode 80 are provided inside the chamber 50. The drift electrode 80 is provided to face the detection element 100, and a negative voltage is applied relative to the ground voltage (GND). The drift cage 70 is provided so as to surround the space between the detection element 100 and the drift electrode 80. The drift cage 70 has a conductor (electronic conductor) for gradually bringing the voltage closer to the ground voltage (GND) from the drift electrode 80 toward the detection element 100 so as to equalize the electric field distribution between the detection element 100 and the drift electrode 80.

When detecting radiation, mixed gas of rare gas and quenching gas is filled in the chamber 50. For example, argon or xenon is used as the rare gas. The quenching gas is, for example, an alkane which keeps a state of gas at ordinary temperature such as ethane or methane, or gas having a quenching action containing carbon dioxide. The gas filled in the chamber 50 may be either a single gas or mixture gas of two or more gases.

[Detection Element]

The structure of the detection element 100 will be described. In the following description, an example in which pixels (anode electrode) serving as units for capturing electron are provided in hexagonal close-packed in the detection element 100 will be described. This arrangement is an example for explaining the arrangement of the anode electrode. In practice, many pixels on the scale of hundreds to millions may be provided. First, referring to FIG. 2, a configuration that appears on a surface of the drift electrode 80 side among the detection element 100 will be briefly described. Thereafter, each configuration of the detection element 100 will be described in detail referring to FIGS. 3 to 7. For explanatory purposes, neighboring anode electrode patterns may not be indicated when drawing a single anode electrode pattern. The same applies to a first cathode electrode pattern and a second cathode electrode pattern.

Figure 2:
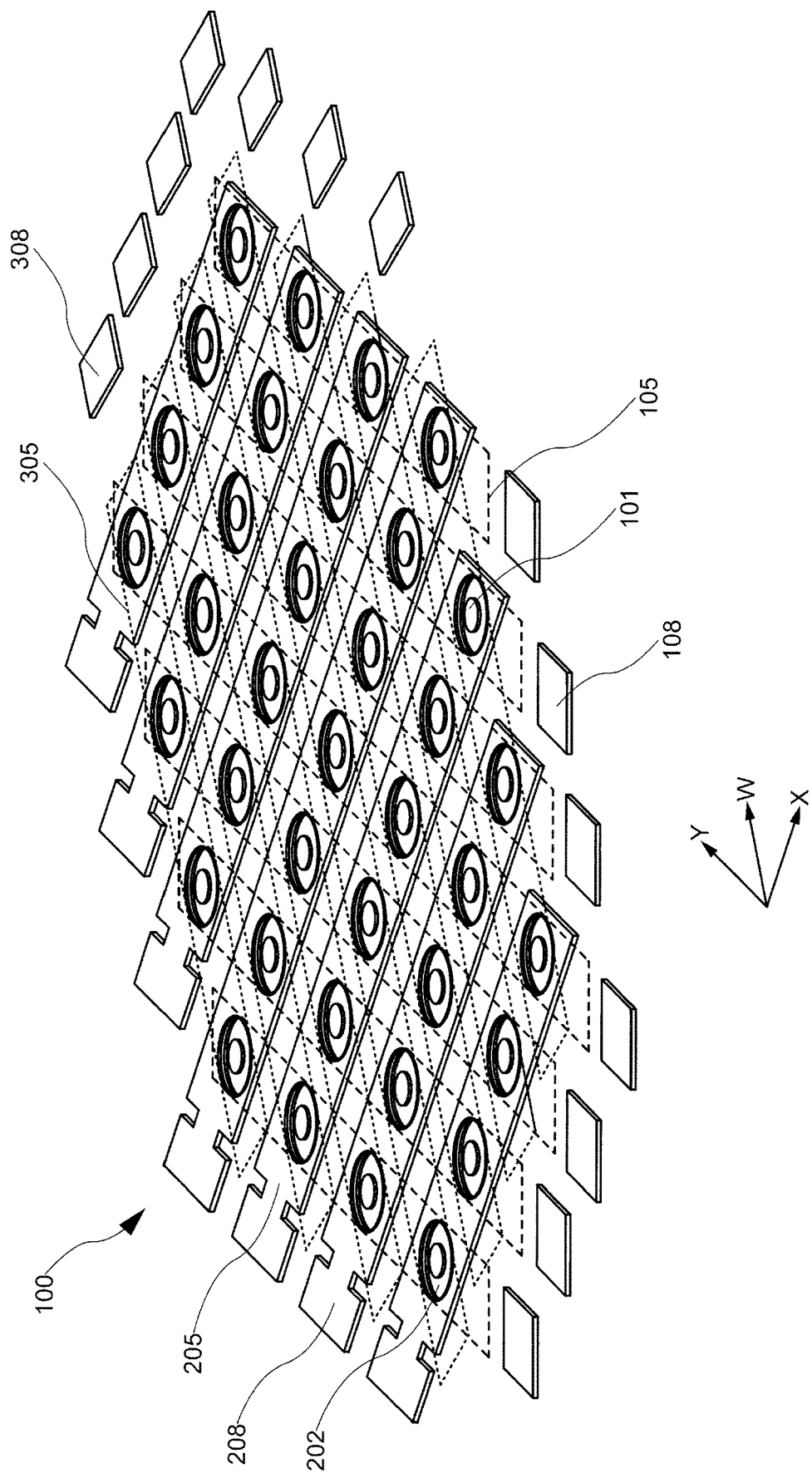
FIG. 2 is a diagram illustrating a detection element according to the first embodiment of the present disclosure.

FIG. 2 is a diagram illustrating a detection element according to the first embodiment of the present disclosure. The detection element 100, which will be described in more detail below, includes a pattern of a conductive metal provided on a substrate (also referred to as an insulating substrate, corresponding to a substrate 110 shown in FIGS. 4 to 7) having an insulating surface. First, an anode electrode 101 (exposed electrode) is provided to be exposed on the insulating substrate. In this example, the anode electrode 101 is provided in a matrix along the X direction (a second direction) and the Y direction (a first direction). In this example, the X and Y directions intersect at 120 degrees. In this example, a distance between the anode electrodes 101 adjacent to each other in the X direction, a distance between the anode electrodes 101 adjacent to each other in the Y direction, and a distance between the anode electrodes 101 adjacent to each other in the W direction (a third direction) are equal to each other. The W direction is a direction other than the X direction and the Y direction, and in this example, the W direction corresponds to a direction along a line that intersects both the straight line extending in the X direction and the straight line extending in the Y direction at 60 degrees. The X direction and the Y direction are not limited to the case where they intersect each other at 120 degrees, for example, the X direction and the Y direction may be provided orthogonally (at 90 degrees). The distances between the neighboring anode electrodes 101 in the X and Y directions may be different.

The anode electrode 101 corresponds to the pixels in which the electrons are captured. As described above, in this example, the anode electrode 101 has 4 to 7 pixels in the X direction and 4 to 7 pixels in the Y direction, for a total of 37 pixels. In the following discussion, a region with 37 pixels provided may be referred to as a detecting region. In this case, an outer shape of the detecting region shown in FIG. 2 (a shape connecting the center of the pixels corresponding to an outer peripheral portion among 37 pixels) is hexagonal.

On the insulating substrate, along the X direction, a first cathode electrode pattern 205 (a second electrode pattern) is provided. In the first cathode electrode pattern 205, an opening 202 is provided corresponding to the pixel. The respective opening 202 is formed to surround the anode electrode 101 pixel by pixel. At an end portion of the first cathode electrode pattern 205, a first cathode terminal 208 is provided on the outside of the detecting region. Since the first cathode electrode pattern 205 is formed in a strip shape, the first cathode electrode pattern 205 also referred to as a first cathode strip electrode. On the outside of the detecting region, an anode terminal portion 108 and a second cathode terminal 308 are further provided. The anode terminal portion 108, the first cathode terminal 208 and the second cathode terminal 308 are terminals for outputting the above-described detection signals Sx, Sy, Sw to the outside of the detection element 100.

The anode terminal portion 108 is connected to the anode electrode 101 via an anode electrode pattern 105 provided along the Y direction (a first electrode pattern). The second cathode terminal 308 is connected to a second cathode electrode pattern 305 (a third electrode pattern) provided along the W direction.

Figure 3:
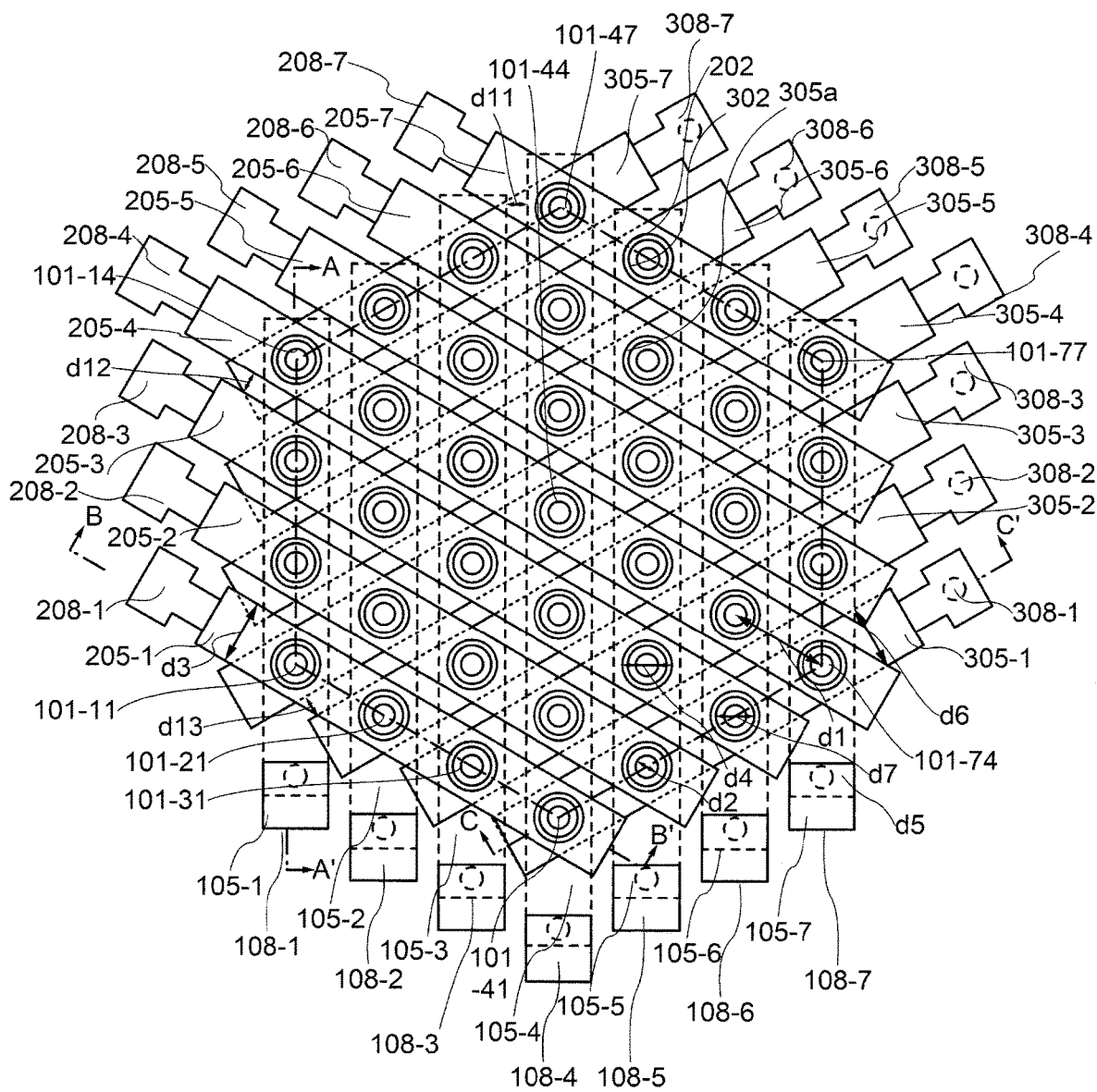
FIG. 3 is a top schematic view illustrating an electrode pattern of a detection element according to the first embodiment of the present disclosure.
Figure 3:
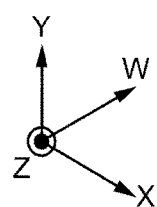
Figure 4:
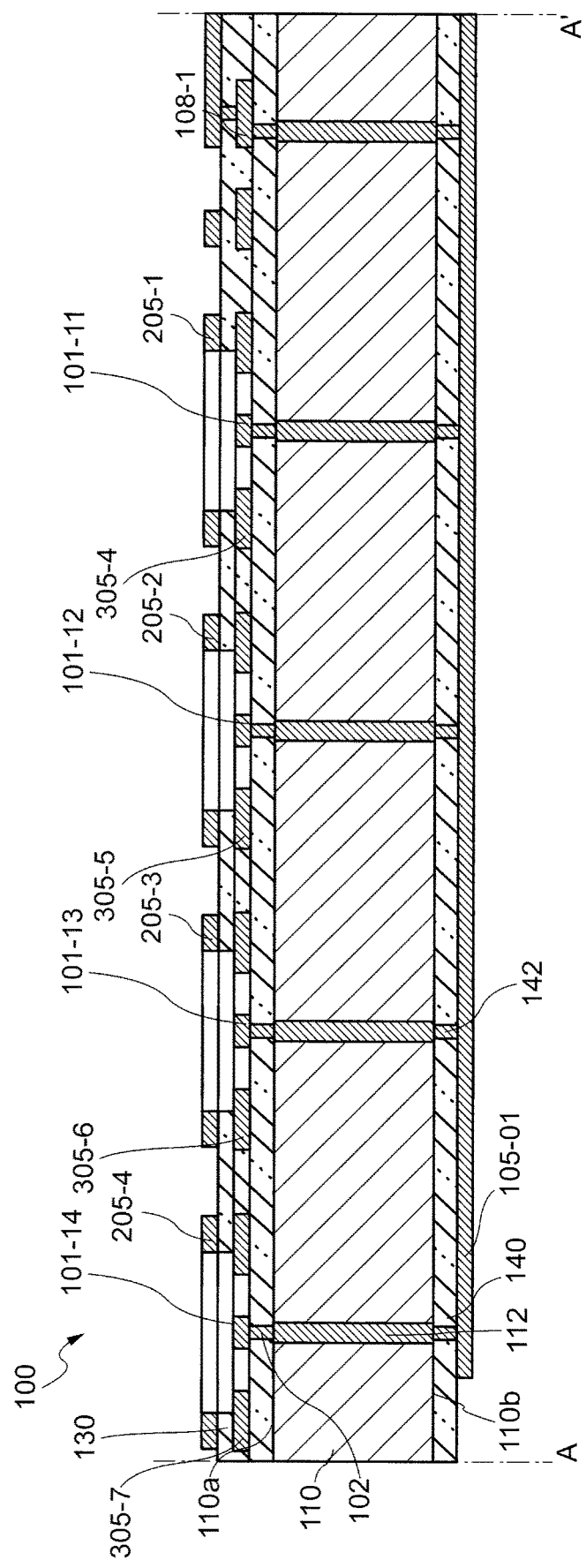
FIG. 4 is a schematic view showing a cross-sectional structure (cross-sectional structure of the cross-sectional line A-P□ in FIG. 3) of a detection element according to the first embodiment of the present disclosure.
Figure 5:
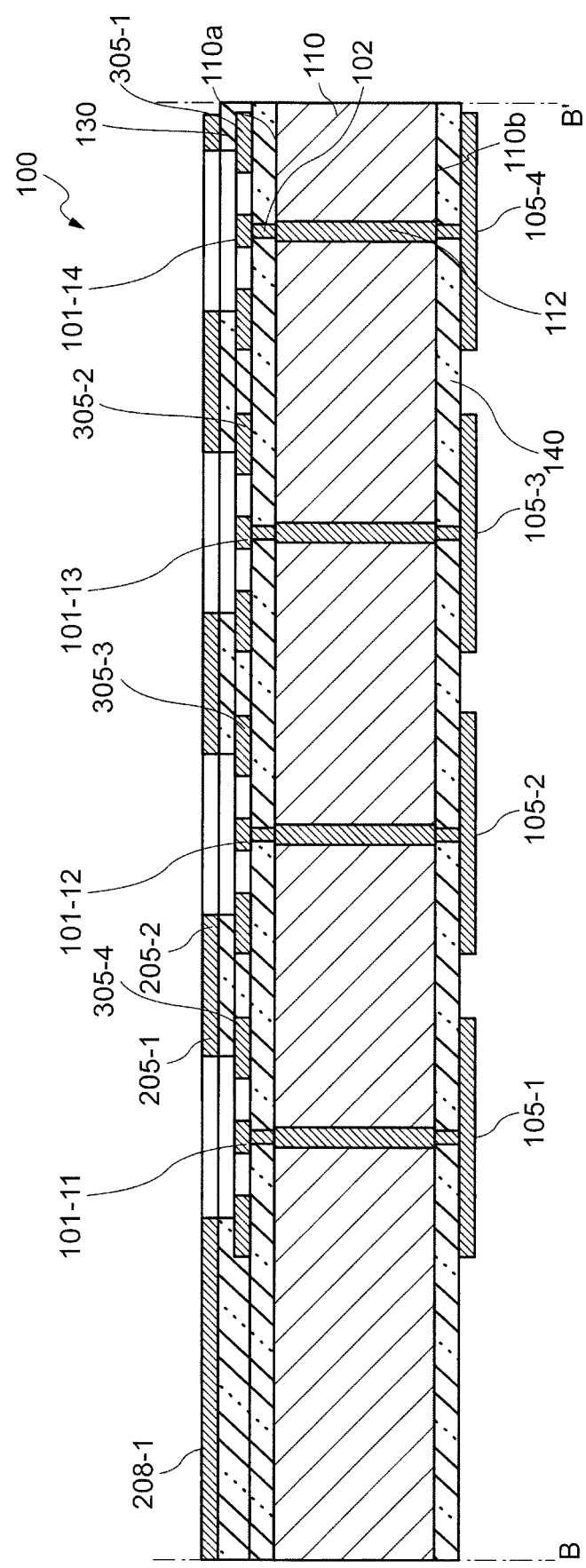
FIG. 5 is a schematic view showing a cross-sectional structure (cross-sectional structure of the cross-sectional line B-B□ in FIG. 3) of a detection element according to the first embodiment of the present disclosure.
Figure 6:
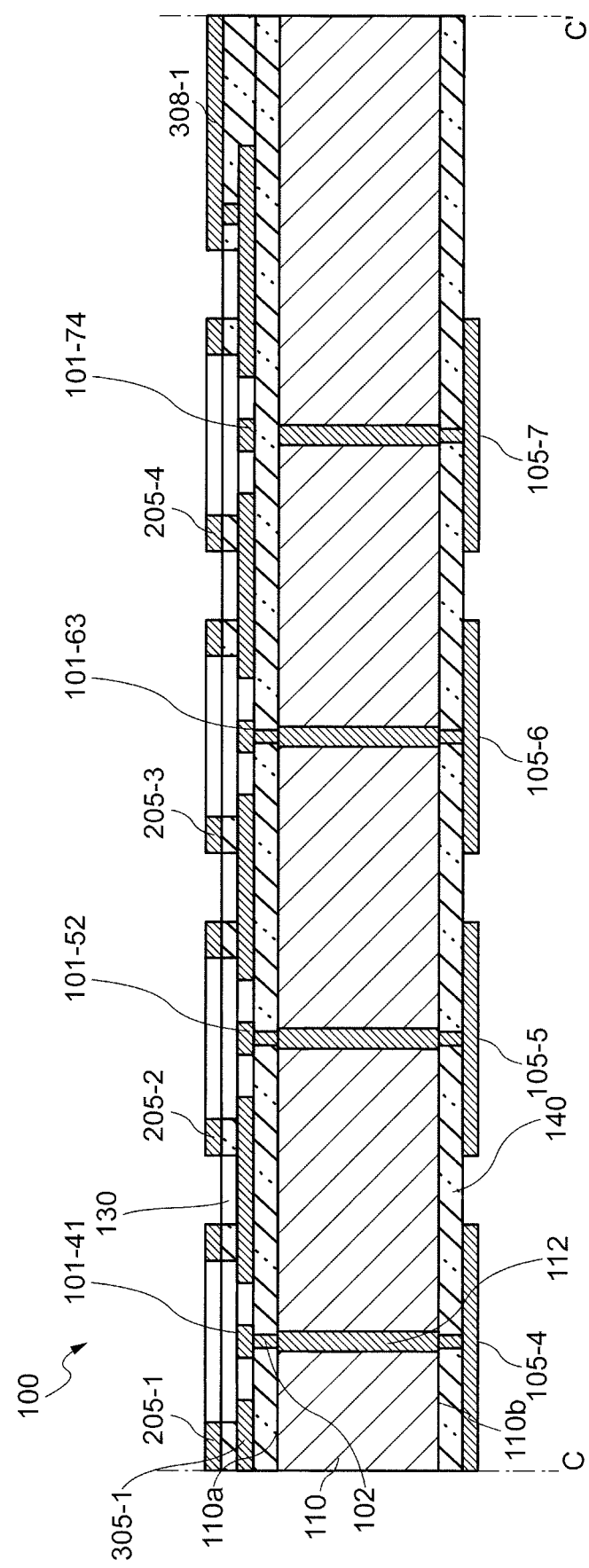
FIG. 6 is a schematic view showing a cross-sectional structure (cross-sectional structure of the cross-sectional line C-C□ in FIG. 3) of a detection element according to the first embodiment of the present disclosure.
Figure 7:
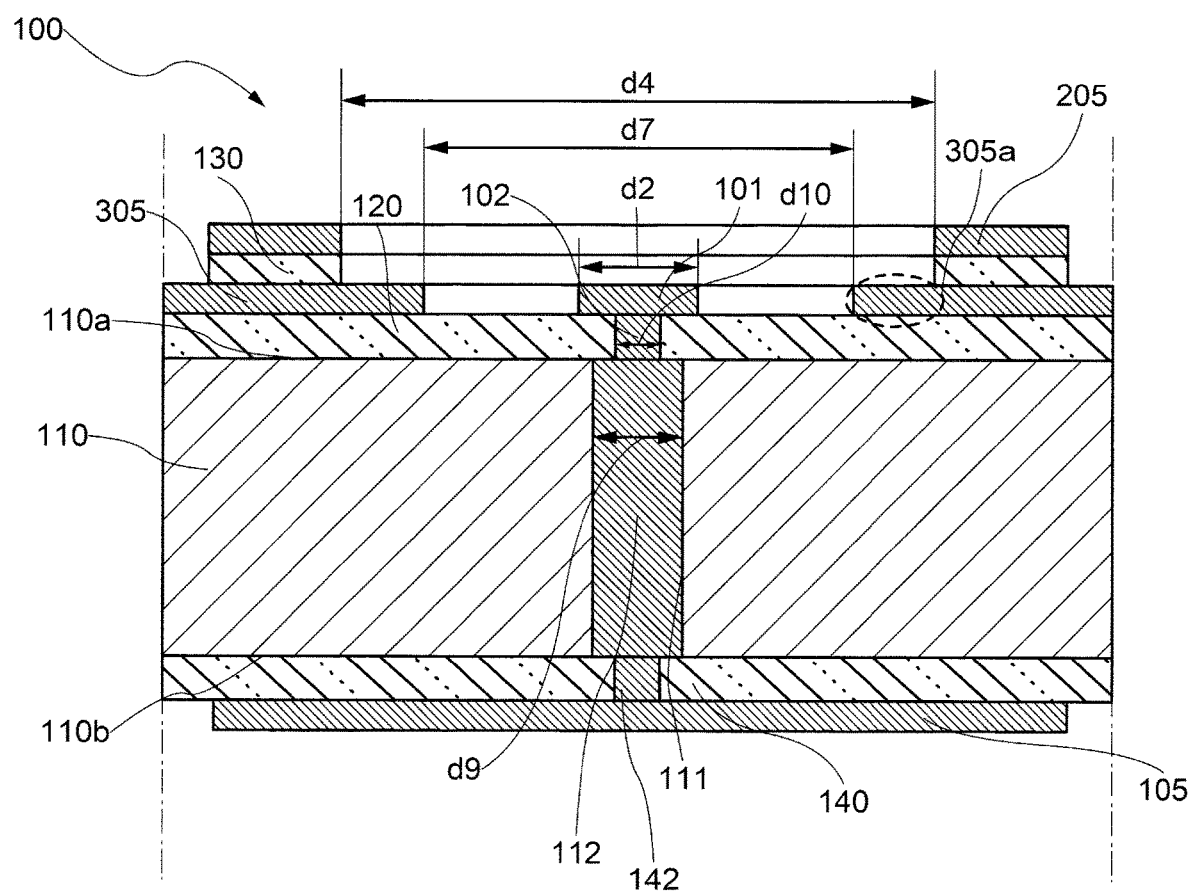
FIG. 7 is an enlarged schematic view of a part of a cross-sectional structure of the detection element of FIG. 6.

FIG. 3 is a diagram illustrating an electrode pattern of the detection element according to the first embodiment of the present disclosure. FIG. 4 is a schematic view showing a cross-sectional structure (cross-sectional structure of the cross-sectional line A-A□ in FIG. 3) of the detection element according to the first embodiment of the present disclosure. FIG. 5 is a schematic view showing a cross-sectional structure (cross-sectional structure of the cross-sectional line B-B□ in FIG. 3) of the detection element according to the first embodiment of the present disclosure. FIG. 6 is a schematic view showing a cross-sectional structure (cross-sectional structure of the cross-sectional line C-C□ in FIG. 3) of the detection element according to the first embodiment of the present disclosure. FIG. 7 is an enlarged schematic view of a part of the cross-sectional structure of the detection element of FIG. 6. As shown in FIG. 3, the Z direction is defined as a direction perpendicular to the X direction, Y direction and W direction (the direction perpendicular to the plane where the anode electrode 101 is provided).

In the following description, as shown in FIG. 3, the plurality of anode electrodes 101, depending on the location in which they are provided, are referred to as the anode electrode 101-$xy$ respectively. Here, x indicates the X direction coordinates (1 to 7) based on an anode electrode 101-11 (the lower left pixel in FIG. 3). On the other hand, y indicates the Y direction coordinates (1 to 7) based on the anode electrode 101-11. In this example, an anode electrode 101-41 corresponds to the lower center anode electrode 101, an anode electrode 101-14 corresponds to the upper left anode electrode 101, an anode electrode 101-44 corresponds to the center anode electrode 101, an anode electrode 101-74 corresponds to the lower right anode electrode 101, an anode electrode 101-47 corresponds to the upper center anode electrode 101, and an anode electrode 101-77 corresponds to the upper right anode electrode 101. The position of a pixel is sometimes referred to as a pixel (xy). For example, a pixel (11) corresponds to the anode electrode 101-11.

The plurality of anode electrodes 101 aligned in the X direction are electrically connected to each other via the anode electrode pattern 105 provided along the Y direction on a second surface 110b of the substrate 110. Since the anode electrode pattern 105 is formed in a strip shape, it also referred to as an anode strip pattern. The anode electrode pattern 105 (105-1 to 105-7) are provided side by side in a direction orthogonal to the Y direction. The anode electrode pattern 105 is connected to the anode terminal portion 108 at its end portion. For example, the anode electrodes 101-11, 101-12, 101-13, 101-14 are electrically connected to an anode terminal portion 108-1 via the anode electrode pattern 105-1.

The anode electrode 101 and the anode electrode pattern 105 are connected by a through electrode 112 as shown in FIG. 4. The anode electrode 101 and the through electrode 112 may be integral. For example, a part exposed from the substrate 110 among the through electrode 112 may be defined as the anode electrode 101. In this case, the anode electrode 101 may or may not protrude from the substrate 110.

As shown in FIG. 7, a via electrode 102 may be provided together with an insulating layer 120 between the anode electrode 101 and the through electrode 112. The width of the via electrode 102 is preferably smaller than the width of the anode electrode 101. Thus, it is possible to alleviate the positional deviation between the through electrode 112 and the anode electrode 101, at the surface of the detection element 100, a uniform electric field is formed. The via electrode 102 is not necessarily provided. An insulating layer 140 and a via electrode 142 may be provided between the through electrode 112 and the anode electrode pattern 105 on the second surface 110b side.

The first cathode pattern 205 exposed and provided along the X direction on a first surface 110a of the substrate 110 surrounds the anode electrode 101 aligned in the X direction by the opening 202 (first opening) respectively and are provided separated from the anode electrode 101. In this example, the first cathode electrode pattern 205 is exposed in the entire upper surface and side surface, but only may be exposed partially. Therefore, it can be said that the first cathode electrode pattern 205 has an exposed portion. The first cathode electrode pattern 205 is connected to the first cathode terminal 208 at its end portion. The first cathode electrode pattern 205 (205-1 to 205-7) are aligned in the direction perpendicular to the X direction. For example, the first cathode electrode pattern 205-1 surrounds the anode electrodes 101-11, 101-21, 101-31, 101-41 respectively by the opening 202. The first cathode electrode pattern 205-1 is connected to a first cathode terminal 208-1. Hereinafter, the relationship between the first cathode electrode pattern 205 and the anode electrode 101 is defined as a relationship of arrangement in which the first cathode electrode pattern 205 and the 101 correspond to each other. For example, the first cathode pattern 205-1 is provided corresponding to the anode electrodes 101-11, 101-21, 101-31, and 101-41.

On the first surface 110a of the substrate 110, the second cathode electrode pattern 305 (305-1 to 305-7) provided along the W direction is provided separate from the anode electrode pattern 105 and the first cathode electrode pattern 205 so as to be sandwiched between the anode electrode pattern 105 and the first cathode electrode pattern 205 between the anode electrodes 101 aligned in the W direction. When the second cathode electrode pattern 305-1 as an example, the second cathode electrode pattern 305-1 is sandwiched in the Z direction by the first cathode electrode patterns 205-1 to 205-4 and the anode electrode patterns 105-4 to 105-7.

The second cathode electrode pattern 305 has an exposed portion 305a on the first surface 110a side of the substrate 110. The exposed portion 305a surrounds the anode electrode 101 provided in the W direction by an opening 302 (second opening) and is provided separately from the anode electrode 101. The width of the opening 302 is less than the width of the opening 202. Therefore, the exposed portion 305a is provided between the anode electrode 101 and the first cathode pattern 205. The second cathode electrode pattern 305 is connected to the second cathode terminal 308 at its end portion. The second cathode electrode pattern 305 (305-1 to 305-7) are aligned in the direction perpendicular to the W direction. For example, the second cathode electrode pattern 305-1 surrounds the anode electrodes 101-41, 101-52, 101-63, 101-74 by the opening 302, respectively, and is connected to a second cathode terminal 308-1. Hereinafter, the relationship between such a second cathode electrode pattern 305 and the anode electrode 101 is defined as a relationship of alignment in which the first cathode electrode pattern 205 and the anode electrode 101 correspond to each other. For example, the second cathode electrode pattern 305-1 is provided corresponding to the anode electrodes 101-41 to 101-74.

By each electrode pattern is provided as described above, a plurality of anode electrode 101 corresponding to the one second cathode electrode pattern 305 is connected to the different anode electrode pattern 105 from each other. The plurality of the anode electrode 101 corresponding to the one second cathode electrode pattern 305 is in correspondence with the first cathode electrode pattern 205 different from each other.

In the present embodiment, the thicknesses of the anode electrode 101, the first cathode electrode pattern 205, and the second cathode electrode pattern 305 are 2 μm or more and 30 μm or less, and preferably 5 μm. This can suppress wiring resistance. The thickness of an insulating layer 130 is 3 μm or more and 100 μm or less, and preferably 20 μm. Thus, it is possible to suppress the crosstalk of the detection signal.

Here, the dimensions of the respective components of the detection element 100 will be exemplified as follows.

Distance d1 (1-pixel length) between centers of adjacent anode electrodes 101: 554.26 μm
Diameter d2 of the anode electrode 101: 60 μm
Linewidth d3 of the first cathode electrode pattern 205: 440 μm
Diameter d4 of the opening 202: 340 μm
Line width d5 of the anode electrode pattern 105: 300 μm
Linewidth d6 of the second cathode electrode pattern 305: 440 μm
Diameter d7 of the opening 302: 260 μm
Diameter d9 of the through electrode 112: 50 μm
Diameter d10 of the via electrode 102: 30 μm
Distance d11 between the anode electrode patterns 105: 180 μm
Distance d12 between the first cathode electrode patterns 205: 40 μm
Distance d13 between the second cathode electrode patterns 305: 40 μm

[Detection Principle of Radiation]

Next, the detection principle of radiation in the radiation detection device 10 will be described referring to FIGS. 8 and 9. A negative voltage is applied to the drift electrode 80 relative to the ground voltage (GND). The ground voltage (GND) is applied to the first cathode electrode pattern 205 and the second cathode electrode pattern 305. A positive voltage is applied to the anode electrode 101 (the anode electrode pattern 105) relative to the ground voltage (GND).

Figure 8:
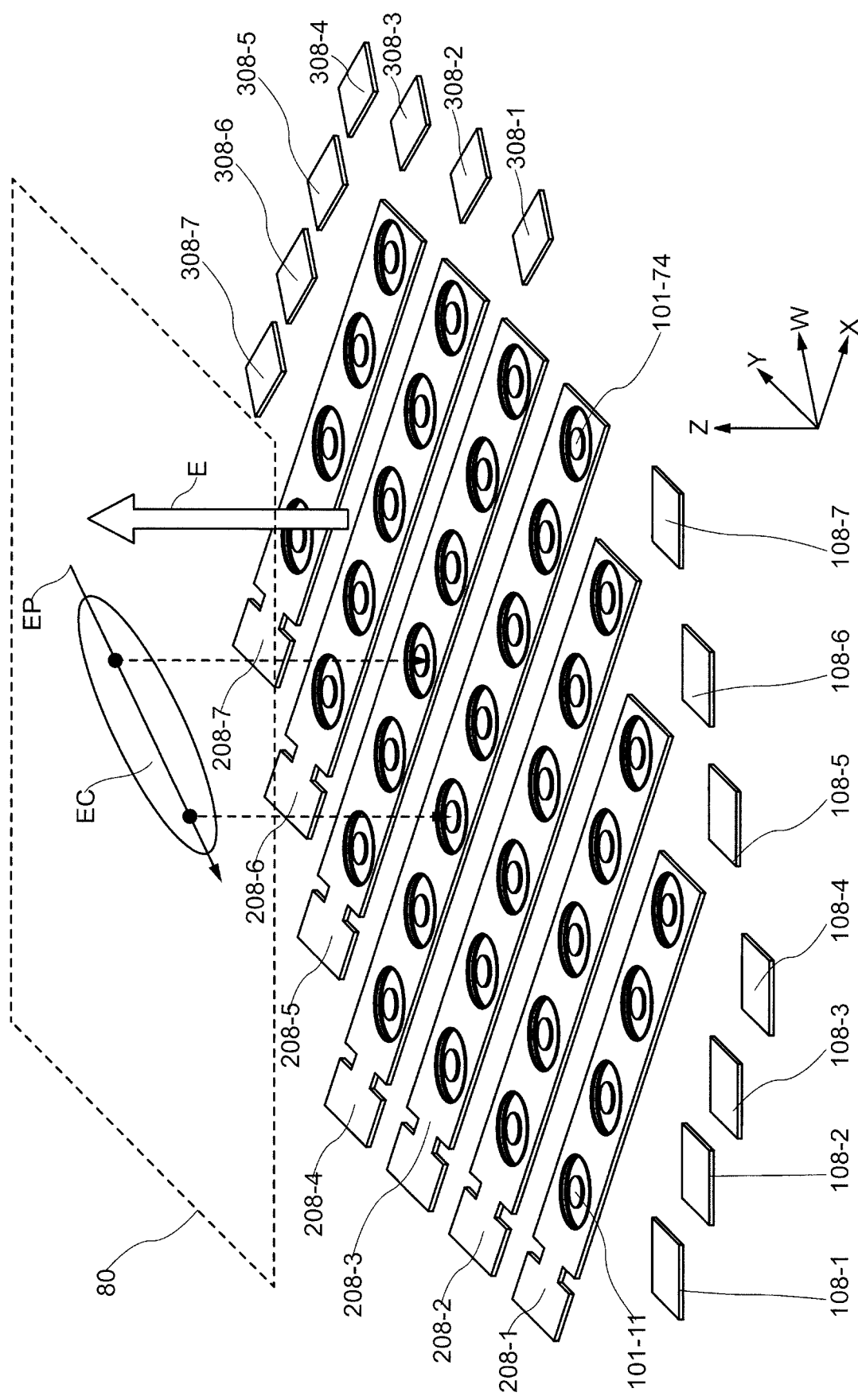
FIG. 8 is a diagram illustrating the detection principle of radiation using a detection element according to the first embodiment of the present disclosure.

FIG. 8 is a diagram illustrating the detection principle of radiation using the detection element according to the first embodiment of the present disclosure. When radiation (charged particles EP) enters the chamber 50, an electron cloud EC is formed by interaction with gas existing in the chamber 50. According to an electric field E generated between the drift electrode 80 and the first cathode electrode pattern 205, each electron of the electron cloud is attracted to the detection element 100 side along the Z direction. The electrons attracted to the detection element 100 side is accelerated by an electric field formed by the first cathode electrode pattern 205 and the anode electrode 101, and is attracted to the anode electrode 101. In this case, the electronic collide with the gas and ionize the gas. The electron generated by ionization multiply in an avalanche and is captured by the anode electrode 101.

Figure 9:
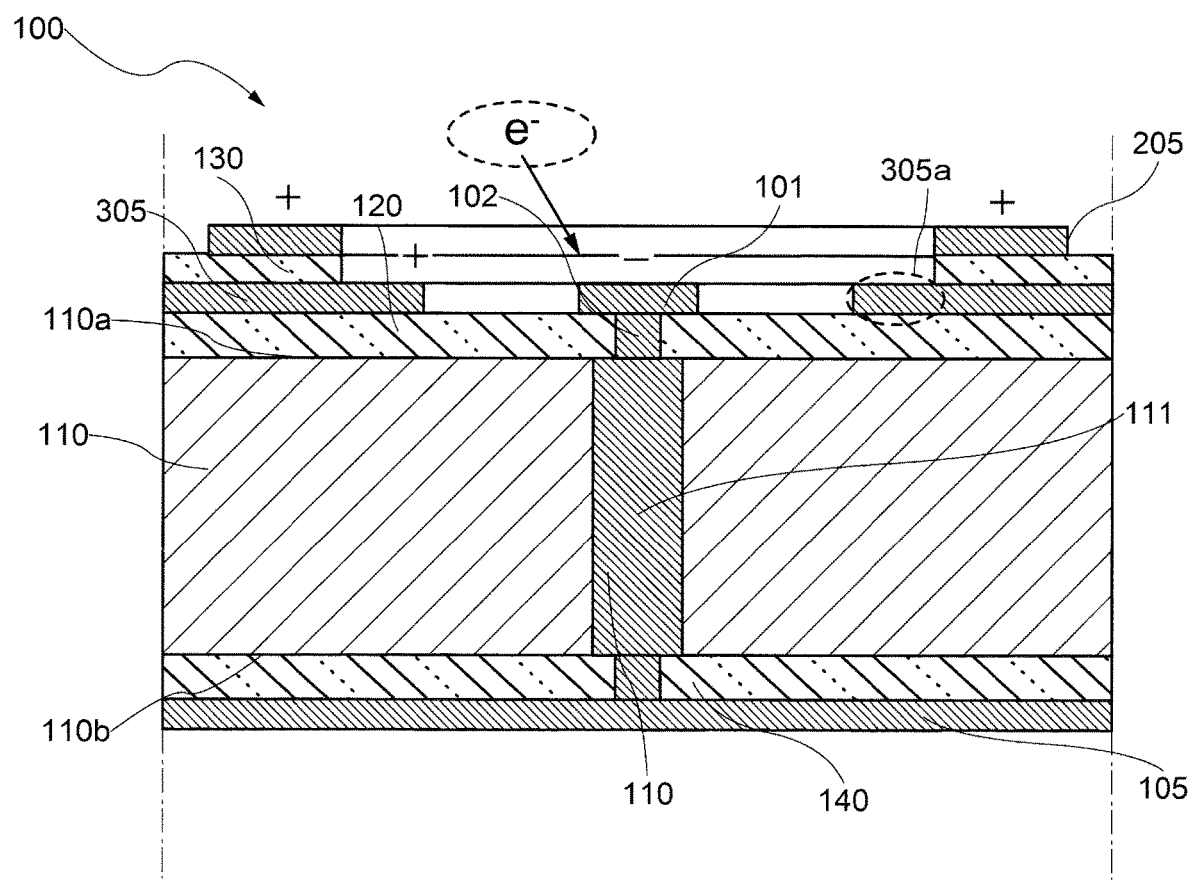
FIG. 9 is a diagram illustrating electric charge generated at each electrode when an anode electrode captures electrons in a detection element according to the first embodiment of the present disclosure.

FIG. 9 is a diagram illustrating charges generated in each electrode when each of the anode electrode captures electrons in the detection element according to the first embodiment of the present disclosure. When the electrons multiplied in an avalanche are captured by the anode electrode 101, negative charges are temporarily generated in the anode electrode 101. On the other hand, cations, which are ionized gases, adhere to the first cathode electrode pattern 205 and the second cathode electrode pattern 305, and a positive charge is temporarily generated. By the effect of the multiplied electrons, the pulse signal (voltage variation) generated from these charges becomes large enough to be read as the electric signals (detection signals Sx, Sy, Sw) from the anode terminal portion 108, the first cathode terminal 208 and the second cathode terminal 308. In the following description, the detection signal Sx output from the anode terminal portions 108-1 to 108-7 may be referred to as the detection signals Sx-1 to Sx-7. The detection signal Sy output from the first cathode terminals 208-1 to 208-7 may be referred to as the detection signals Sy-1 to Sy-7. The detection signal Sw output from the second cathode terminals 308-1 to 308-7 may be referred to as the detection signals Sw-1 to Sw-7.

By using the time when the voltage variation in these detection signals Sx, Sy, Sw occurred, and the position of the terminal for outputting the electric signal in which the voltage variation occurs, it is possible to calculate the track of the charged particle EP. In this track, the position in the Z direction is calculated as a relative position.

Figure 10:
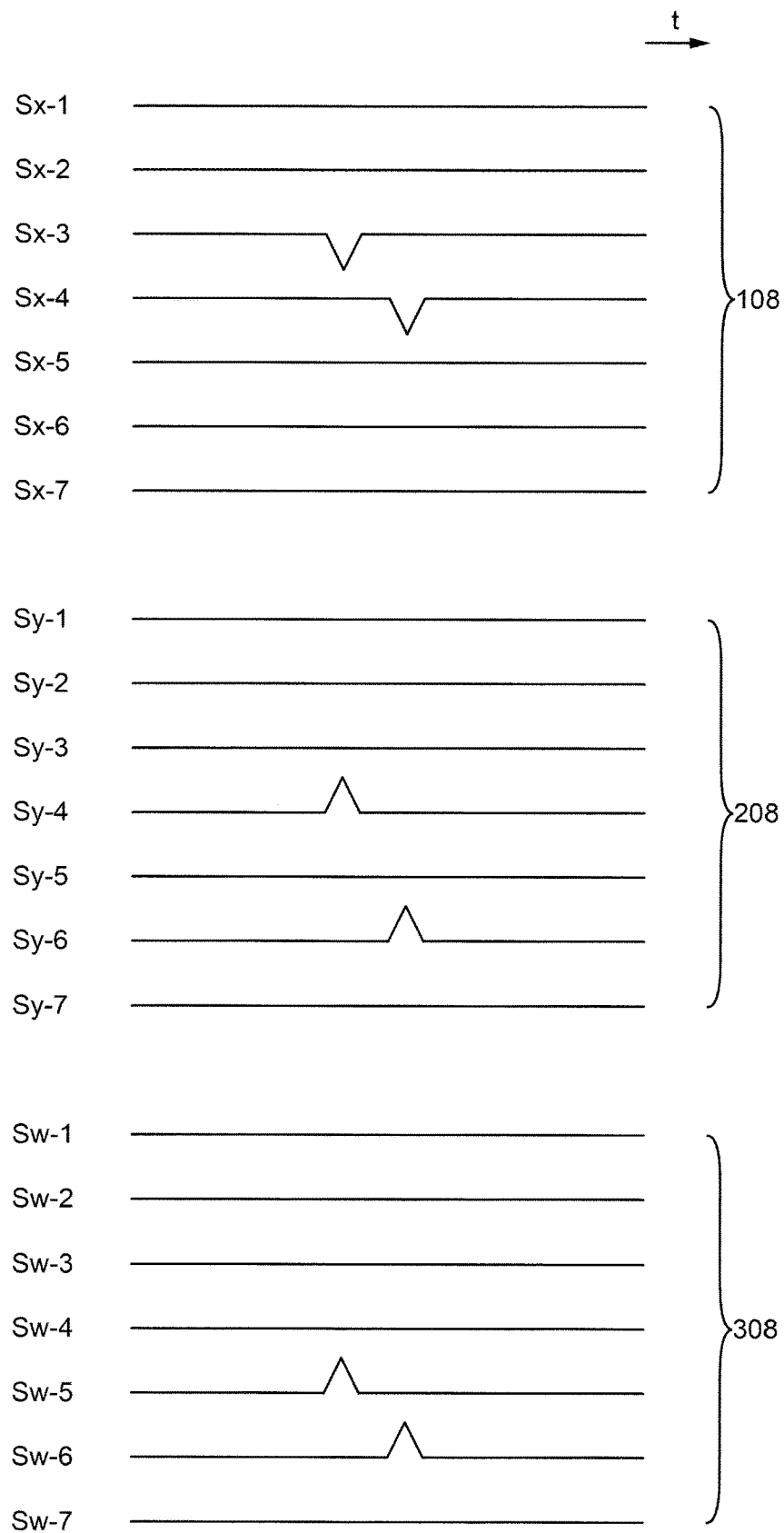
FIG. 10 is a diagram illustrating a first exemplary pattern of a detection signal output from a detection element according to the first embodiment of the present disclosure.

FIG. 10 is a diagram illustrating a first exemplary pattern of the detection signal output from the detection element according to the first embodiment of the present disclosure. The pattern of the detection signal shown in FIG. 10 assumes situation that charged particle EP is incident as shown in FIG. 8. In this case, an anode electrode 101-34 (pixel (34)) captures the electron, and then the anode electrode 101-46 (pixel (46)) captures the electron.

According to such circumstances, first, corresponding to the capture of electron by the anode electrode 101-34, voltage variations occur in the detection signals Sx-3, Sy-4, Sw-5. In other words, when the arithmetic device 90 determines that the time when the voltage variations occur in the detection signals Sx-3, Sy-4, Sw-5 is the same, the anode electrode 101-34 in which the anode electrode pattern 105-3, the first cathode electrode pattern 205-4, and the second cathode electrode pattern 305-5 intersect, which correspond to the detection signals Sx-3, Sy-4, Sw-5, are identified as the anode electrode 101 in which captured electron.

Thereafter, corresponding to the capture of electrons by the anode electrode 101-46, voltage variations occur in the detection signals Sx-4, Sy-6, Sw-6. In other words, when the arithmetic device 90 determines that the time when the voltage variations occur in the detection signals Sx-4, Sy-6, Sw-6 is the same, the anode electrode 101-46 in which the anode electrode pattern 105-4, the first cathode electrode pattern 205-6 and the second cathode electrode pattern 305-6 intersect, which corresponds to the detection signals Sx-4, Sy-6, Sw-6, is identified as the anode electrode 101 in which electron is captured.

In such cases, even if any one of the detection signals Sx, Sy, and Sw does not exist, that is, the anode electrode in which the electron is captured can be identified by two types of detection signals. On the other hand, as will be described below, when electrons are captured in the anode electrodes 101-34, 101-46 at the same time, the arithmetic device 90 cannot accurately identify the anode electrode 101 in which the electron was captured by only the two types of detection signals.

Figure 11:
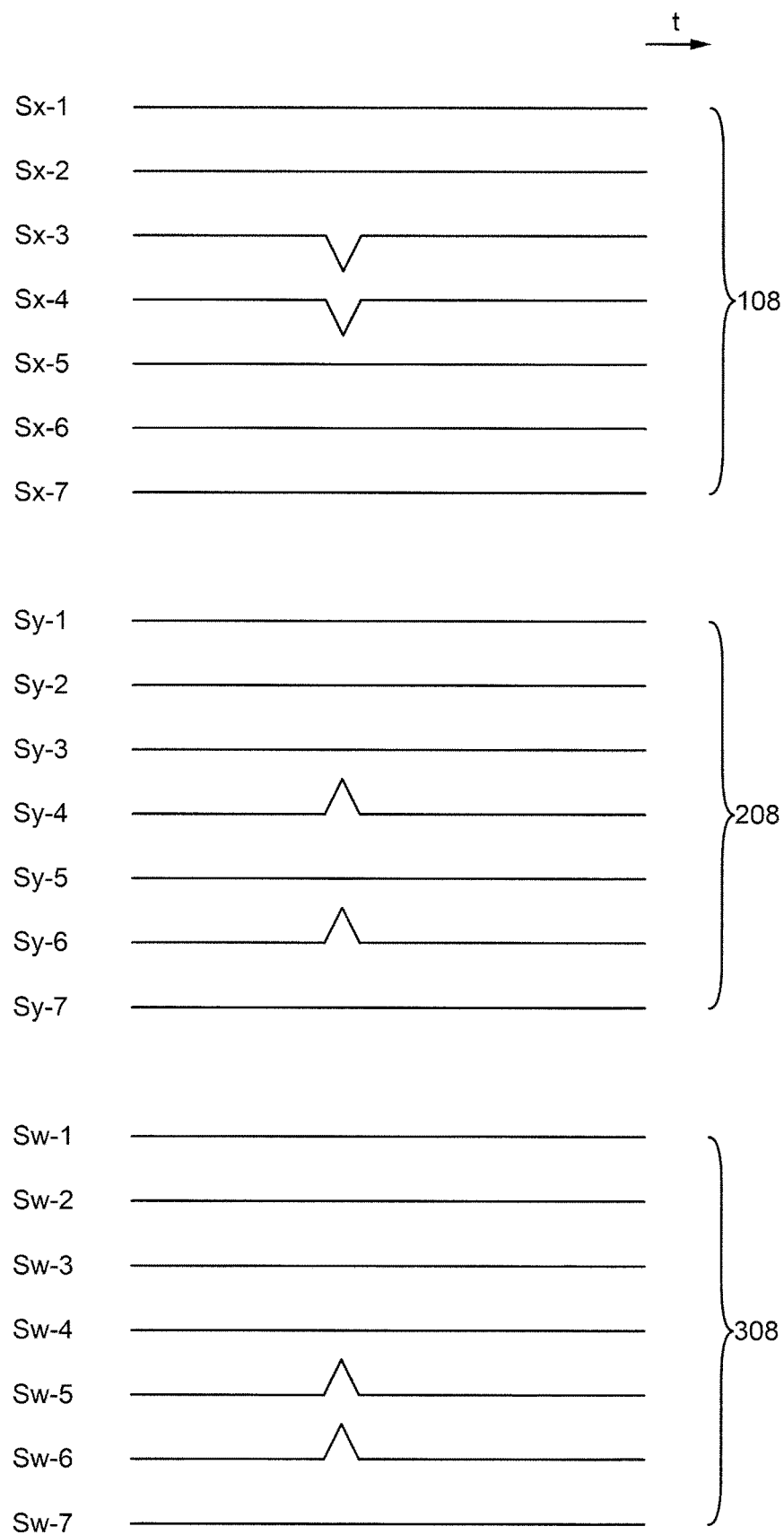
FIG. 11 is a diagram illustrating a second exemplary pattern of a detection signal output from a detection element according to the first embodiment of the present disclosure.

FIG. 11 is a diagram illustrating a second exemplary pattern of the detection signal output from the detection element according to the first embodiment of the present disclosure. The second example shows a situation in which the electrons are simultaneously captured by the anode electrode 101-34 (pixel (34)) and the anode electrode 101-46 (pixel (46)).

According to such circumstances, the arithmetic device 90 determines that the times when the voltage variation occurs in the detection signals Sx-3, Sx-4, Sy-4, Sy-6, Sw-5, Sw-6 are same. In this case, the anode electrode 101 in which electrons are captured is accurately identified by using detection signals Sx, Sy, and Sw, but is not accurately identified by using only two types of detection signals (e.g., Sx and Sy) as in the prior art. This situation will be described referring to FIG. 12.

Figure 12:
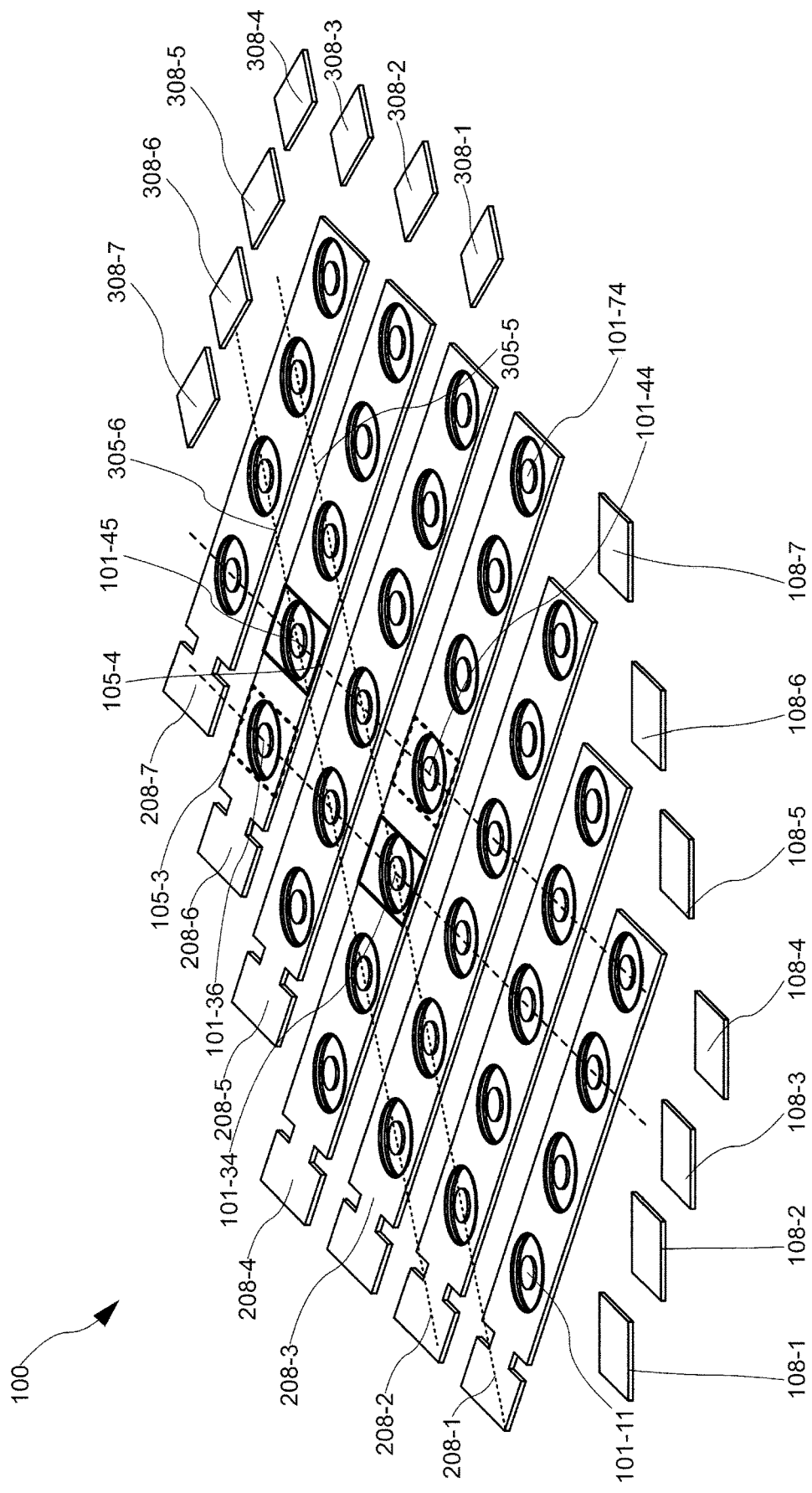
FIG. 12 is a perspective view illustrating an electron capture position calculated from a pattern of the detection signal shown in FIG. 10.
Figure 13:
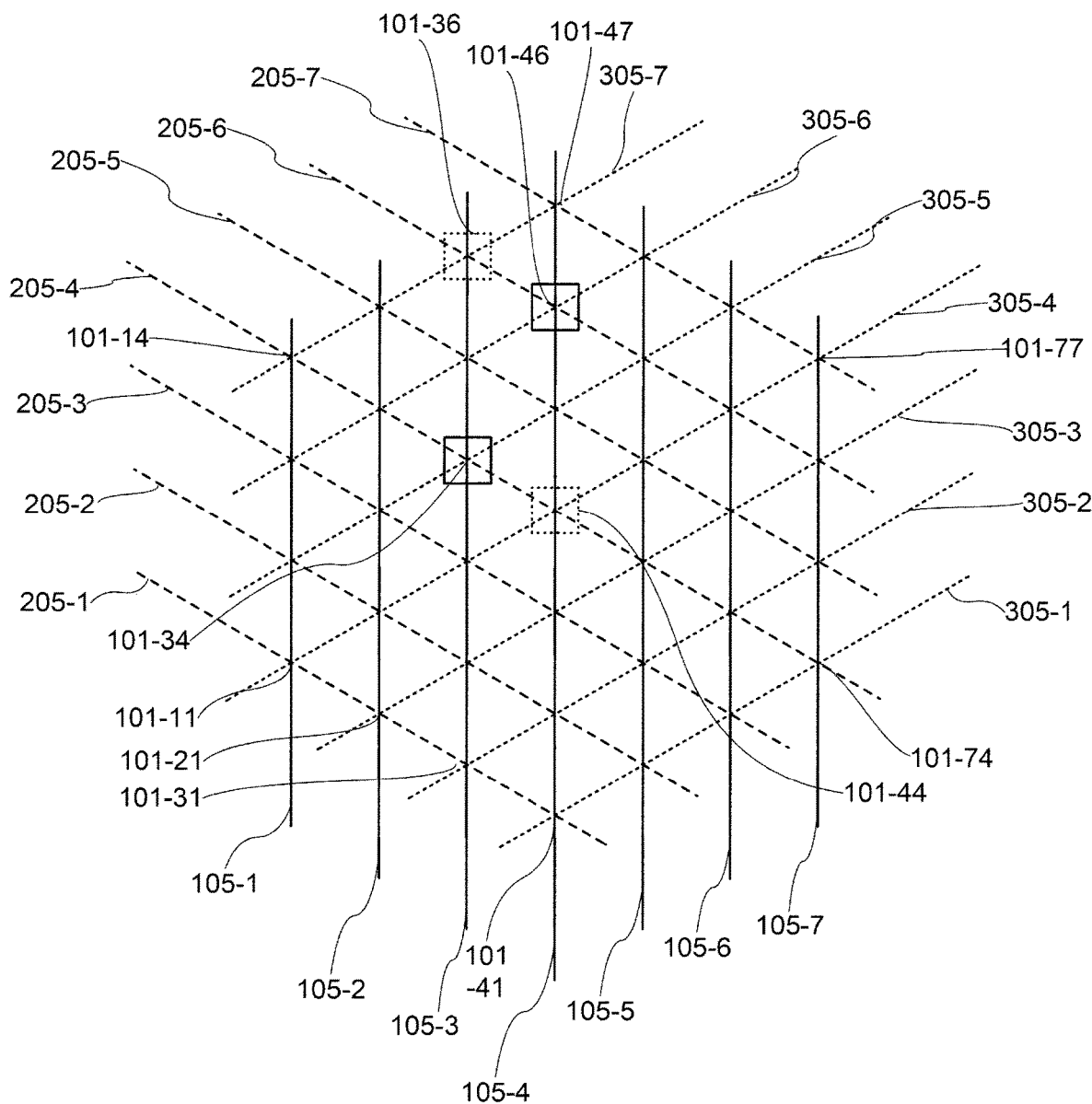
FIG. 13 is a schematic diagram illustrating an electron capture position calculated from a pattern of the detection signal shown in FIG. 10.

FIG. 12 is a perspective view illustrating an electron capture position which is calculated from the pattern of the detection signal shown in FIG. 11. FIG. 13 is a top schematic view illustrating an electron capture position calculated from the pattern of the detection signal shown in FIG. 11. First, when using the detection signal Sx, Sy, the portions where the anode electrode patterns 105-3, 105-4, and the first cathode electrode patterns 205-4, 205-6 intersect are the anode electrodes 101-34, 101-44, 101-36, 101-46 (pixel (34), (44), (36), (46)). Therefore, the anode electrodes 101-44 and 101-36 (pixels (44) and (36)) in which electrons are not actually captured are erroneously detected.

On the other hand, when using the detection signals Sx, Sy, Sw, the portions where the anode electrode patterns 105-3, 105-4, the first cathode electrode patterns 205-4, 205-6 and the second cathode electrode patterns 305-5, 305-6 intersect are the anode electrodes 101-34, 101-46 (pixels (34), (46)). Therefore, the false positive that occurred when using only the detection signals Sx Sy does not occur when using the detection signals Sx, Sy, Sw.

Thus, the radiation detection device 10 in the present embodiment, even when electrons are captured simultaneously in the two anode electrodes 101, it is possible to identify the two anode electrodes 101 because three types of detection signals Sx, Sy, Sw are used. Even when using three types of detection signals Sx, Sy, Sw, it will result in false detection when electrons are captured simultaneously in the three anode electrodes 101. However, the probability that electrons are captured simultaneously in the three anode electrodes 101 is smaller than the probability that electrons are captured simultaneously by the two anode electrodes 101. Therefore, erroneous detection can be reduced, and as a result, detection efficiency and detection accuracy of radiation are improved.

In this example, although the detection element 100 has 37 pixels (the anode electrode 101) in which the pixels are hexagonally provided, based on one anode electrode 101, the configuration can be generalized by having at least two anode electrodes 101 aligned in the X direction, and two anode electrodes 101 aligned in the Y direction. The two anode electrode 101 aligned in the X or Y direction may be defined as the adjacent anode electrode 101 or as the non-adjacent anode electrode 101. If it is generalized by the two non-adjacent anode electrodes 101, there will be another anode electrode 101 between them.

When the anode electrodes 101 are adjacent to each other, the four (2×2) anode electrodes 101 correspond to, for example, the anode electrodes 101-22, 101-23, 101-32, 101-33 (pixels (22), (23), (32), and (33)). If the anode electrodes 101 are not adjacent to each other, the four (2×2) anode electrodes 101 correspond to, for example, the anode electrodes 101-11, 101-14, 101-41, and 101-44 (pixels (11), (14), (41), and (44)).

[Method of Manufacturing Detection Element]

Next, a method of manufacturing the detection element 100 according to the present embodiment will be described referring to FIGS. 14 to 23.

Figure 14:
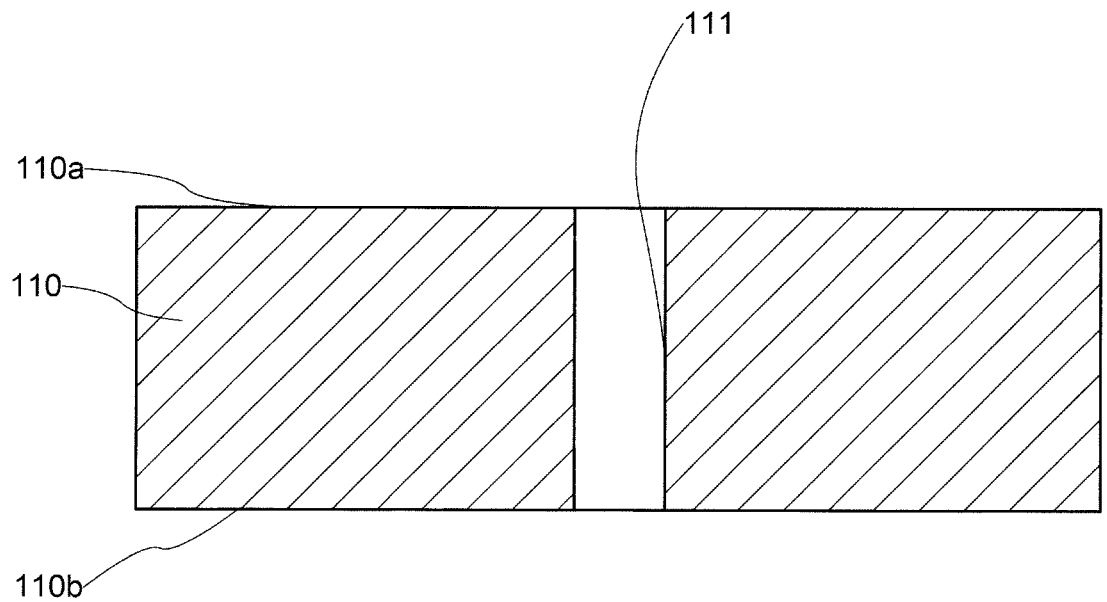
FIG. 14 is a schematic cross-sectional view showing a method of manufacturing a detection element according to the first embodiment of the present disclosure.

First, as shown in FIG. 14, a through hole 111 penetrating from the first surface 110a to the second surface 110b is formed in the substrate 110. An insulating material having a high insulating property is used for the substrate 110. In this example, a glass substrate such as soda glass substrate, alkali-free glass substrate, quartz glass substrate, or the like is used for the substrate 110. The thickness of the substrate 110 may be appropriately set to 100 μm or more and 1000 μm or less. In this example, the thickness of the substrate 110 is 380 μm.

The through hole 111 is formed, for example, by using a laser irradiation method (which can be referred to as a laser ablation method) on the substrate 110. As the laser, an excimer laser, a neodymium: YAG (Nd: YAG) laser, a femtosecond laser, or the like is used. When an excimer laser is used, light in the ultraviolet region is irradiated. For example, when xenon chloride is used in the excimer laser, a light with a wavelength of 308 nm is irradiated. The diameter of irradiation by the laser may be 10 μm or more and less than 250 μm. A hole diameter of the through hole 111 can be appropriately set within a range of 10 μm or more and less than 250 μm. In this example, the hole diameter of the through hole 111 is constant for the vertical direction of the substrate 110 and is 50 μm. When forming the through hole 111 of the substrate 110, a dry etching method or a wet etching method may be used in addition to the laser irradiation method.

Figure 15:
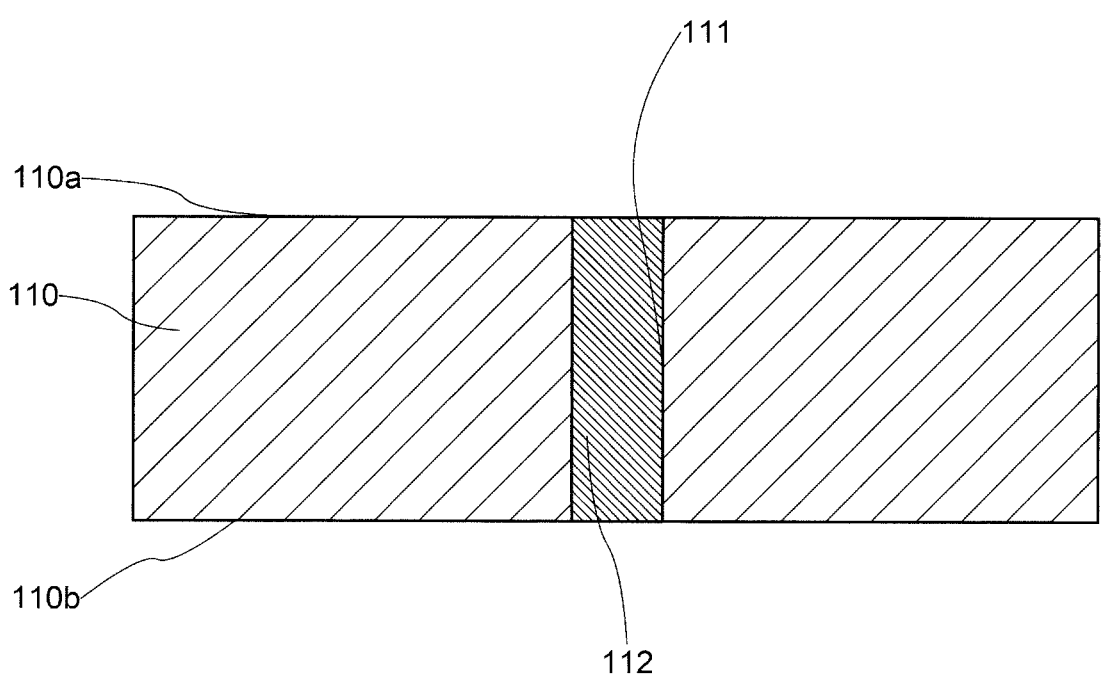
FIG. 15 is a schematic cross-sectional view showing a method of manufacturing a detection element according to the first embodiment of the present disclosure.

Next, as shown in FIG. 15, the through electrode 112 is formed in the through hole 111. Copper (Cu), nickel (Ni), gold (Au), silver (Ag), tin (Sn) or the like is used for the through electrode 112. The through electrode 112 is formed by a plating method. For example, copper (Cu) formed by a plating method is used for the through electrode 112. The through electrode 112 formed by the plating method is planarized by a CMP (Chemical Mechanical Polishing) method.

Figure 16:
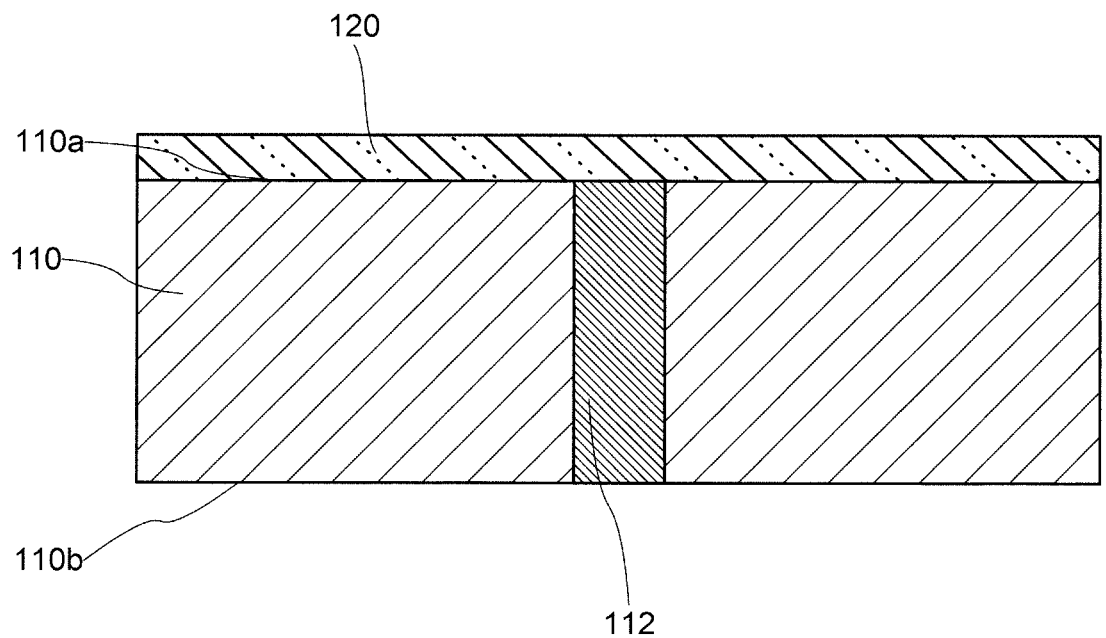
FIG. 16 is a schematic cross-sectional view showing a method of manufacturing a detection element according to the first embodiment of the present disclosure.

Next, as shown in FIG. 16, the insulating layer 120 is formed on the first surface 110a of the substrate 110. The insulating layer 120 may be made of an inorganic insulating material or an organic insulating material, or a mixture of an inorganic insulating material and an organic insulating material. The insulating layer 120 is formed by a coating method and a laminating method. Examples of the coating method includes a spin-coating method, a spray-coating method, a slit-coating method, and a dip-coating method. In this example, a polyimide film or the like formed by a spin-coating method is used for the insulating layer 120. The thickness of the insulating layer 120 is not particularly limited but ranges from 1 μm or more and 20 μm or less. In this example, the thickness of the insulating layer 120 is 4 μm.

Figure 17:
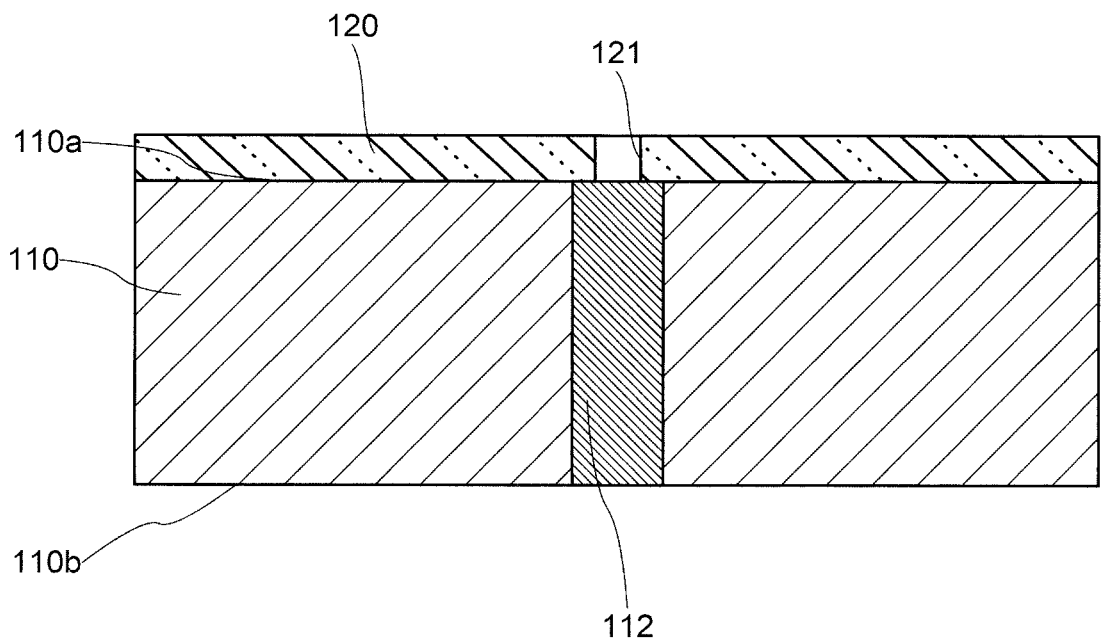
FIG. 17 is a schematic cross-sectional view showing a method of manufacturing a detection element according to the first embodiment of the present disclosure.

Next, as shown in FIG. 17, an opening 121 is provided in the insulating layer 120. The opening 121 is formed using, for example, a photolithography method and an etching method. In FIG. 17, when the insulating layer 120 includes a photosensitive material, the opening 121 may be formed only by a photolithography method. As a result, the number of manufacturing steps can be reduced.

Figure 18:
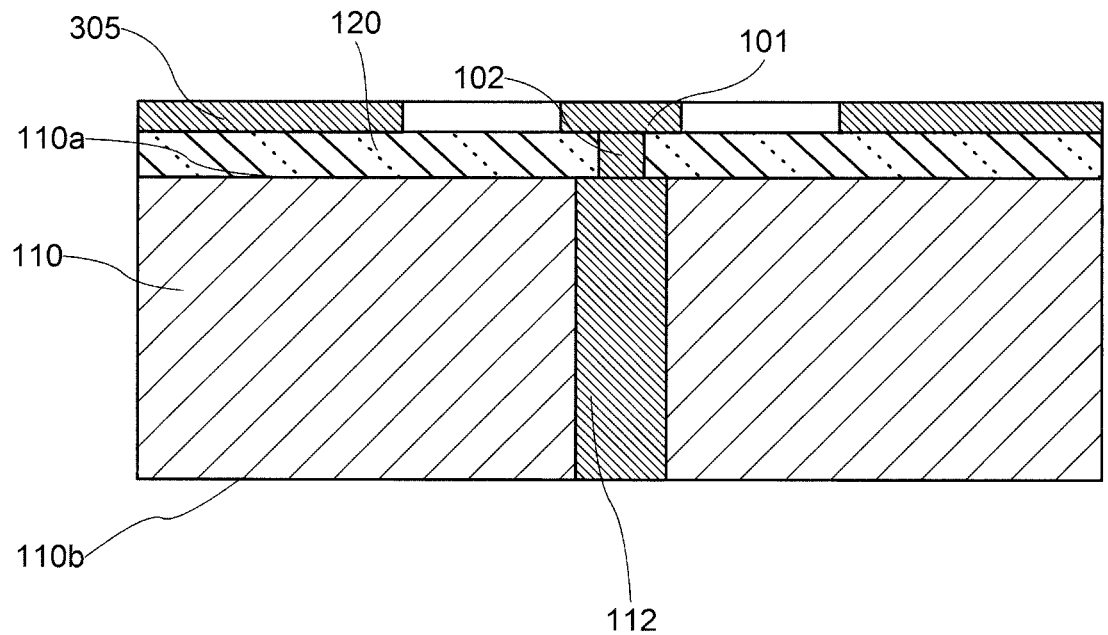
FIG. 18 is a schematic cross-sectional view showing a method of manufacturing a detection element according to the first embodiment of the present disclosure.

Next, as shown in FIG. 18, the anode electrode 101, the via electrode 102 and the second cathode electrode pattern 305 are formed on the through electrode 112 and the insulating layer 120. The anode electrode 101, the via electrode 102 and the second cathode electrode pattern 305 are formed by the plating method, CVD method, a sputtering method, or a printing method or the like. Copper (Cu) is used for the anode electrode 101, the via electrode 102 and the second cathode electrode pattern 305. In addition to copper (Cu), a metallic material such as aluminum (Al), gold (Au), silver (Ag), nickel (Ni), tungsten (W), molybdenum (Mo), or titanium (Ti) may be used for the anode electrode 101, the via electrode 102 and the second cathode electrode pattern 305.

In the above, an example in which the anode electrode 101 and the via electrode 102 are formed at one time is shown, but the via electrode 102 may be formed before forming the anode electrode 101 and the second cathode electrode pattern 305.

Figure 19:
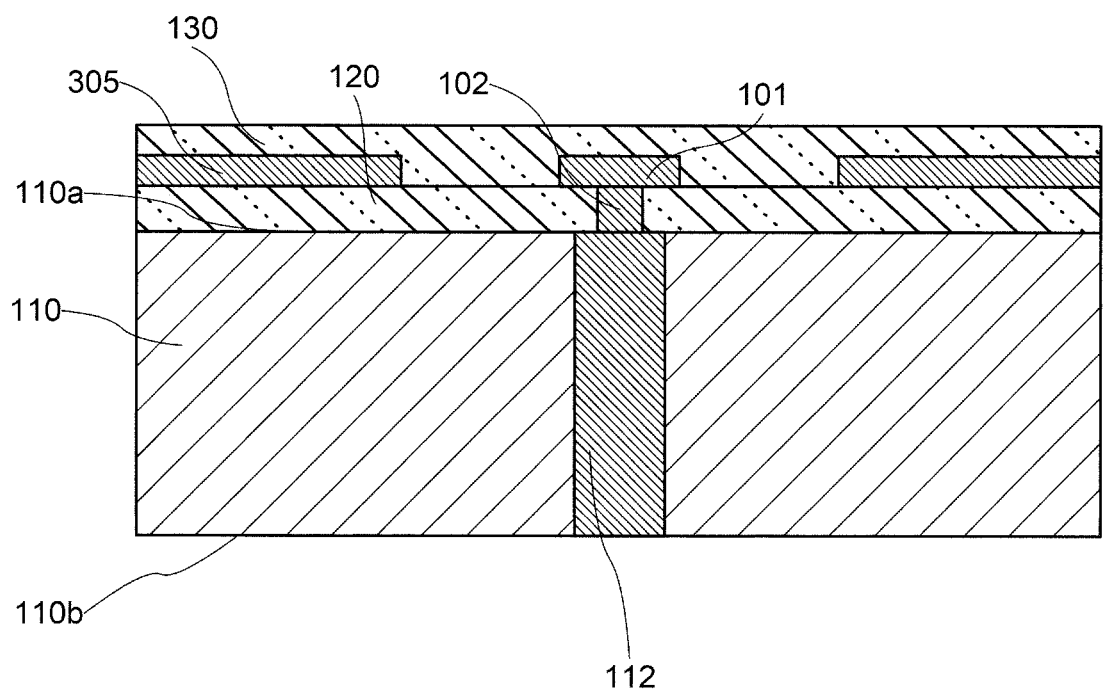
FIG. 19 is a schematic cross-sectional view showing a method of manufacturing a detection element according to the first embodiment of the present disclosure.

Next, as shown in FIG. 19, the insulating layer 130 is formed on the insulating layer 120, the anode electrode 101 and the second cathode electrode pattern 305. Materials and methods similar to the insulating layer 120 may be used for the insulating layer 130.

Figure 20:
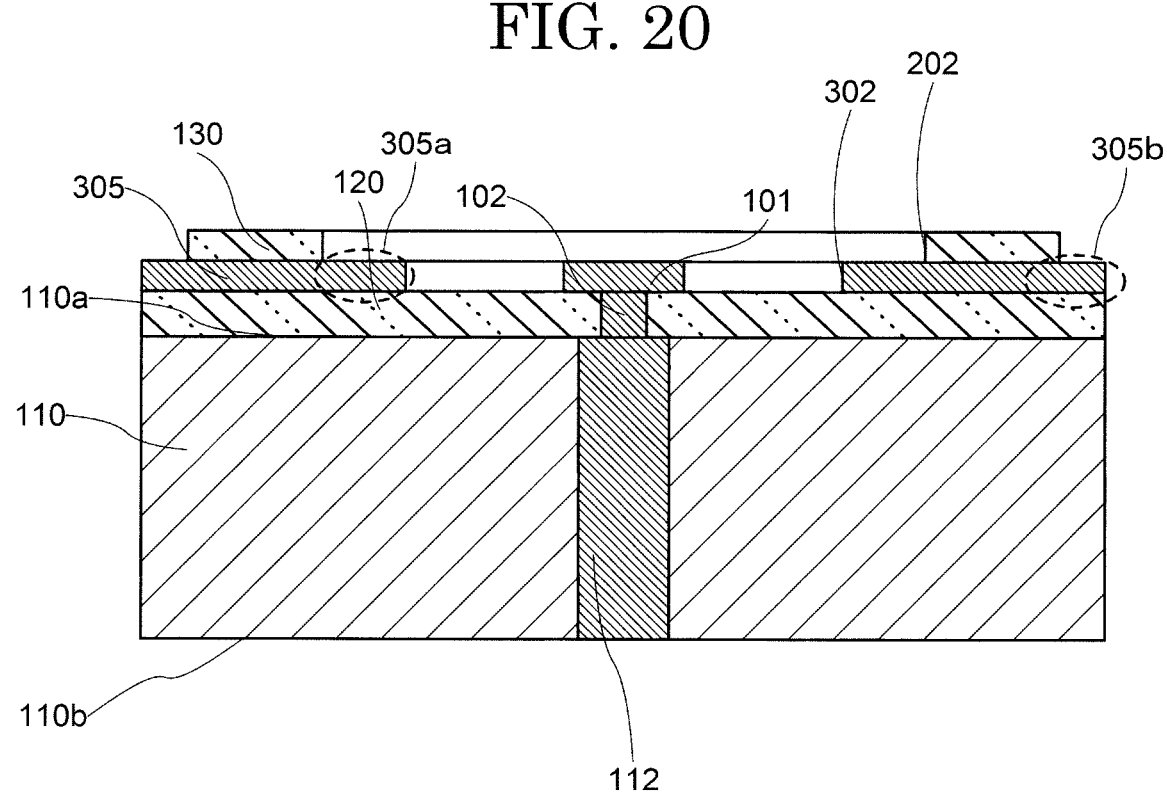
FIG. 20 is a schematic cross-sectional view showing a method of manufacturing a detection element according to the first embodiment of the present disclosure.

Next, as shown in FIG. 20, among the anode electrode 101 and the second cathode electrode pattern 305, the end portion on the anode electrode 101 side, which becomes the exposed portion 305a, and the insulating layer 120 are exposed to form the opening 202 and the opening 302. The opening 202 and the opening 302 may be formed in the same manner as the opening 121. In this case, the insulating layer 130 may be removed so that the portion 305b where the first cathode electrode pattern 205 and the second cathode electrode pattern 305, which are formed later, do not overlap is exposed. Thus, the insulating layer 130 is prevented from being charged at the time of radiation detection, it is possible to suppress abnormal discharge.

Figure 21:
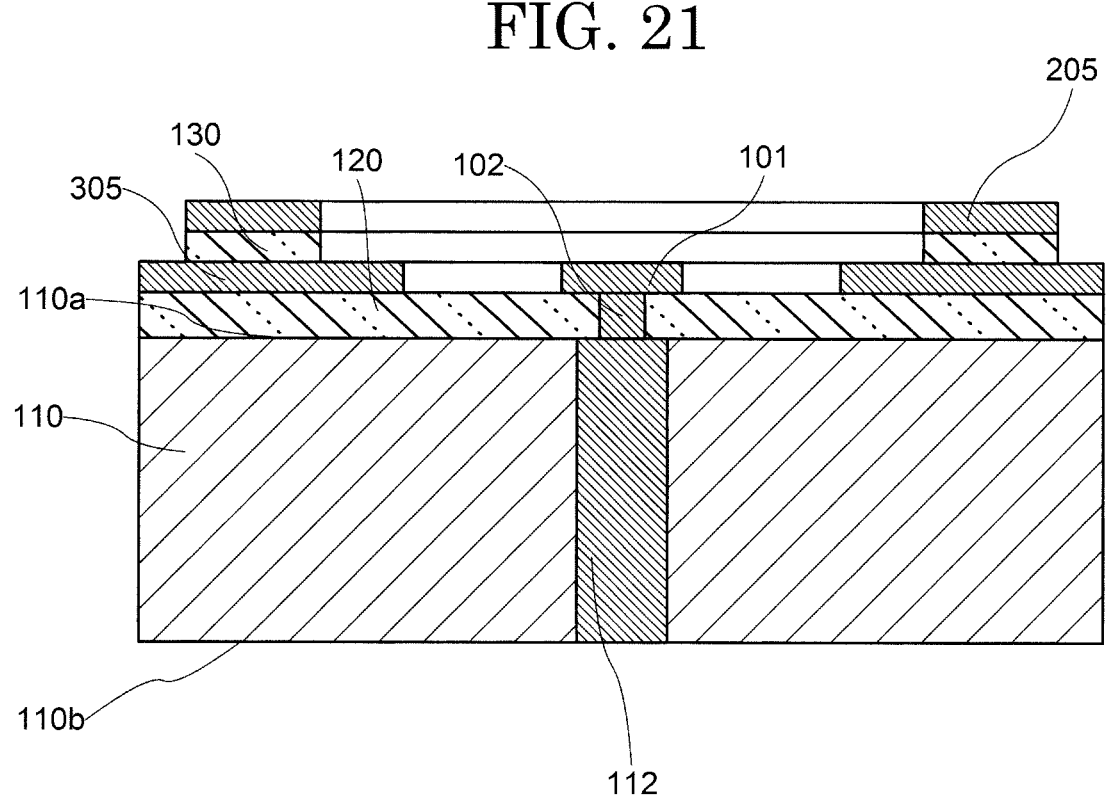
FIG. 21 is a schematic cross-sectional view showing a method of manufacturing a detection element according to the first embodiment of the present disclosure.

Next, as shown in FIG. 21, the first cathode electrode pattern 205 is formed on the insulating layer 130. The first cathode electrode pattern 205 is formed using materials and methods similar to those of the anode electrode 101, the via electrode 102, and the second cathode electrode pattern 305.

Figure 22:
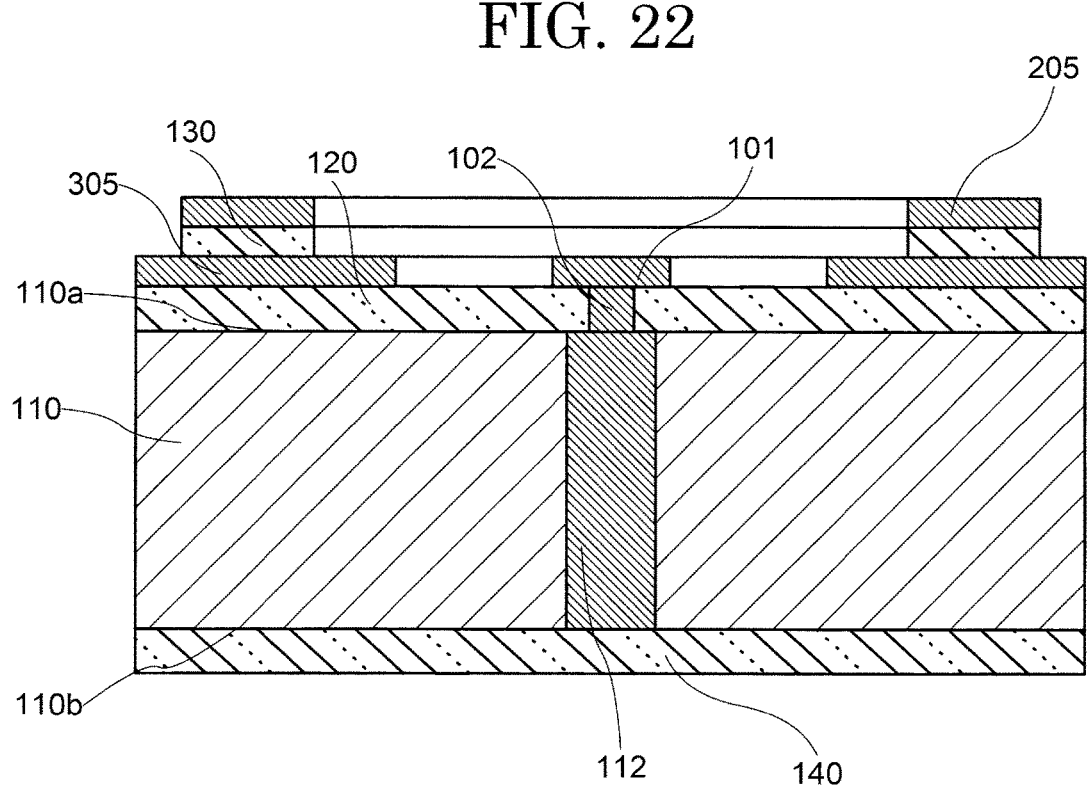
FIG. 22 is a schematic cross-sectional view showing a method of manufacturing a detection element according to the first embodiment of the present disclosure.

Next, as shown in FIG. 22, the insulating layer 140 is formed on the second surface 110b of the substrate 110. The insulating layer 140 is formed in the same materials and methods as the insulating layer 120. In this example, a polyimide film formed by a spin-coating method is used as the insulating layer 140.

Figure 23:
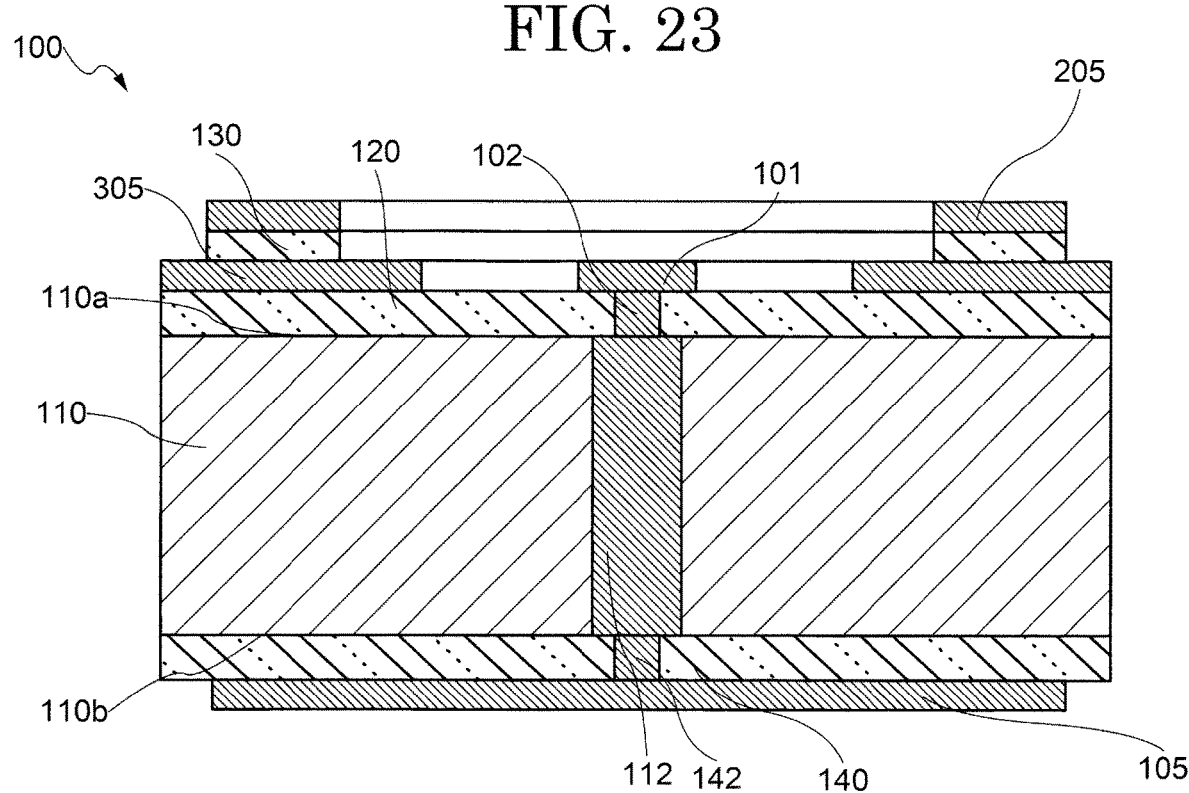
FIG. 23 is a schematic cross-sectional view showing a method of manufacturing a detection element according to the first embodiment of the present disclosure.

Next, as shown in FIG. 23, a portion of the insulating layer 140 is removed to form the via electrode 142 and the anode electrode pattern 105 on the through electrode 112 and the insulating layer 140. The via electrode 142 and the anode electrode pattern 105 are formed using materials and methods similar to those of the via electrode 102, the anode electrode 101, and the second cathode electrode pattern 305. The detection element 100 can be manufactured by the above method.

Modifications

Figure 24:
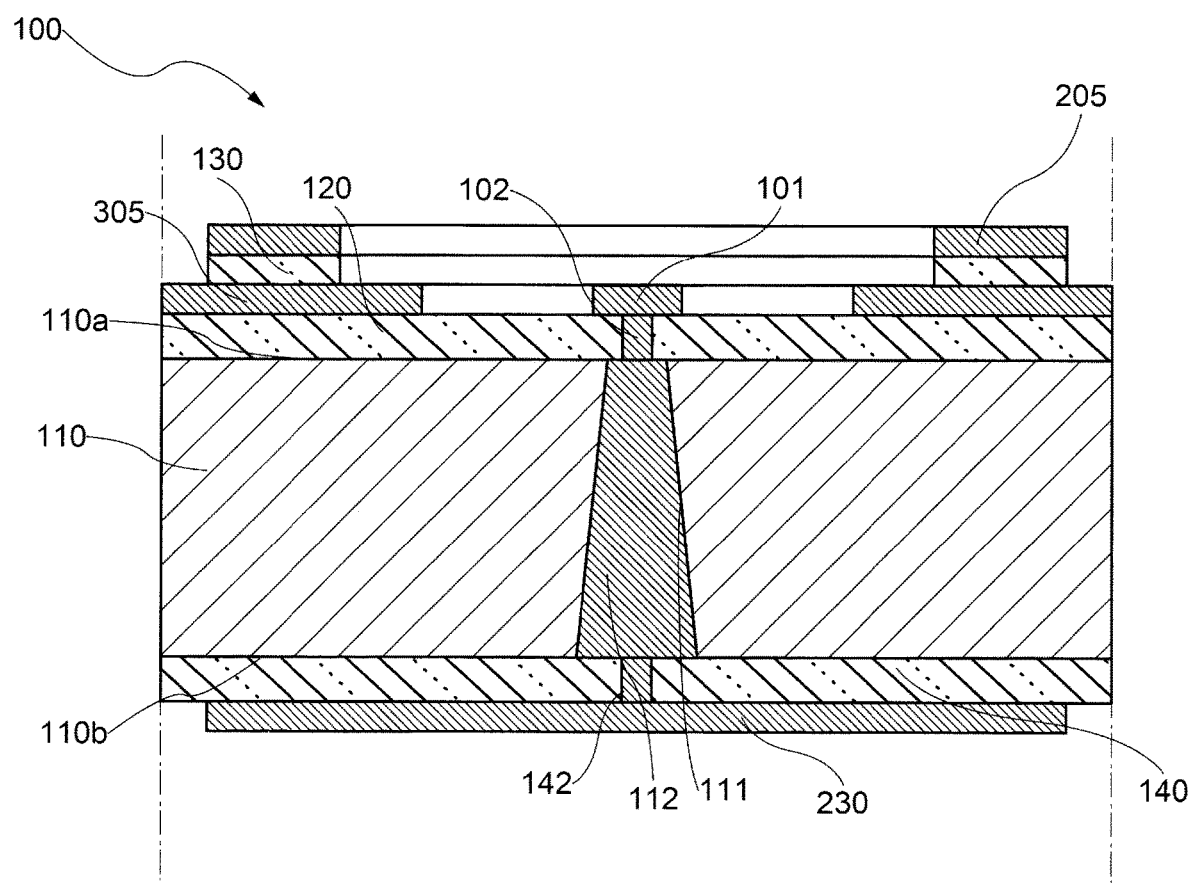
FIG. 24 is a modification of the cross-sectional structure of a detection element according to the first embodiment of the present disclosure.

In the present embodiment, the through hole 111 is described as having a cylindrical shape, but the present disclosure is not limited thereto. The diameter of the through hole may vary based on the direction perpendicular to the substrate (in other words, the side surfaces of the through hole may have a slope rather than be parallel to the direction perpendicular to the substrate 110). For example, as shown in FIG. 24, the diameter of the through hole 111 may be decreased from the second surface 110b toward the first surface 110a (that is, the through hole may be a conic trapezoid shape).

In the present embodiment, the insulating layer 140 and the anode electrode pattern 105 were formed after forming the respective components of the first surface side but is not limited thereto. The insulating layer 140 and the anode electrode pattern 105 may be formed first before forming the respective components on the first side.

In the present embodiment, the portion 305b of the second cathode electrode pattern is not necessarily exposed (i.e., only the exposed portion 305a is exposed in the second cathode electrode pattern 305).

Figure 25:
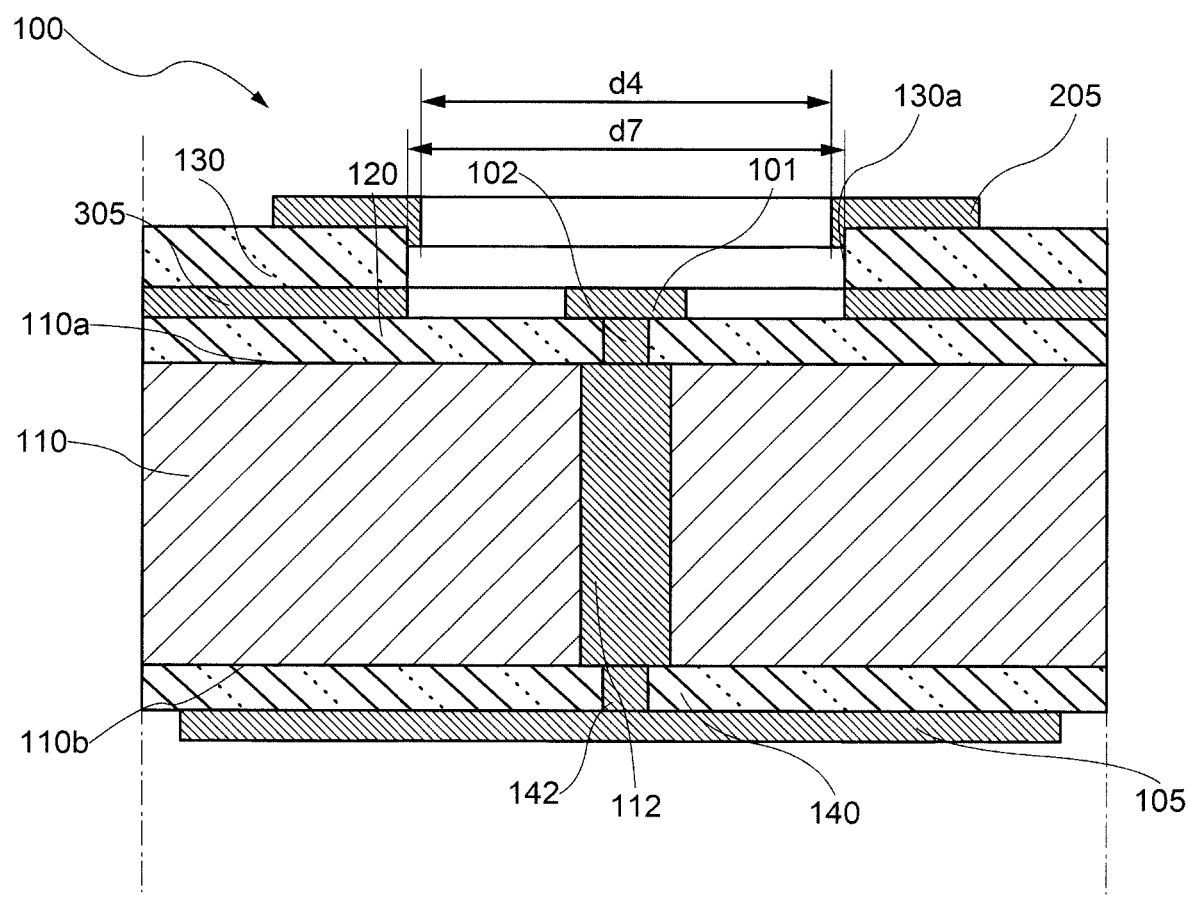
FIG. 25 is a modification of the cross-sectional structure of a detection element according to the first embodiment of the present disclosure.
Figure 26:
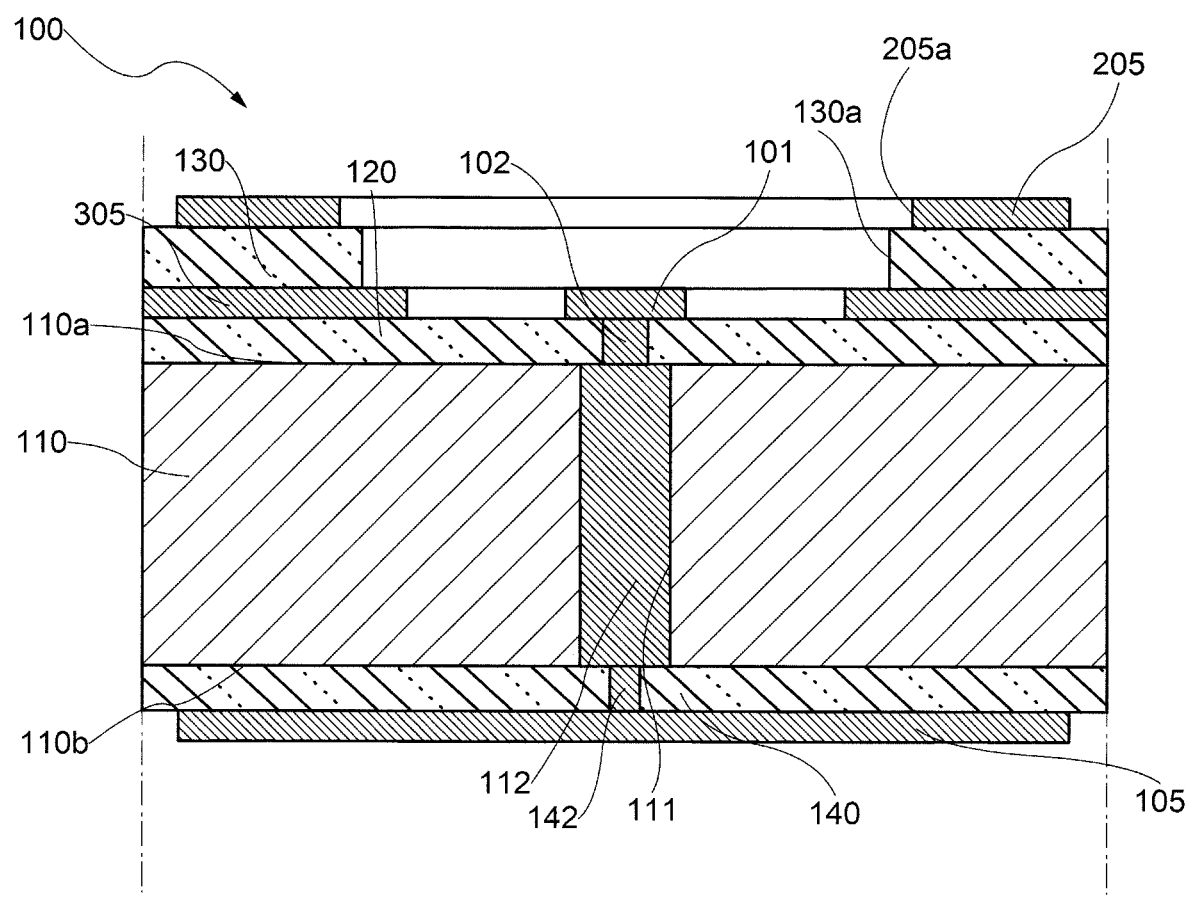
FIG. 26 is a modification of the cross-sectional structure of a detection element according to the first embodiment of the present disclosure.

In the present embodiment, an example in which the diameter d4 of the opening 202 in the first cathode electrode pattern 205 is larger than the diameter d7 of the opening 302 in the second cathode electrode pattern 305 is shown but the present disclosure is not limited thereto. The side surface of the first cathode electrode pattern 205, and the side surface of the insulating layer 130 may not be flush. For example, the diameter d4 of the opening 202 of the first cathode electrode pattern 205 may be the same as the diameter d7 of the opening 302 in the second cathode electrode pattern 305. As shown in FIG. 25, the diameter d4 of the opening 202 in the first cathode electrode pattern 205 is narrower than the diameter d7 of the opening 302 in the second cathode electrode pattern 305, the first cathode electrode pattern 205 may be provided so as to cover a portion of the side surface 130a of the insulating layer 130. In this case, only the side surface of the second cathode electrode pattern 305 may be exposed. As shown in FIG. 26, the side surfaces of the first cathode pattern 205 may be provided farther away from the anode electrode 101 than the side surface 130a of the insulating layer 130.

Figure 27:
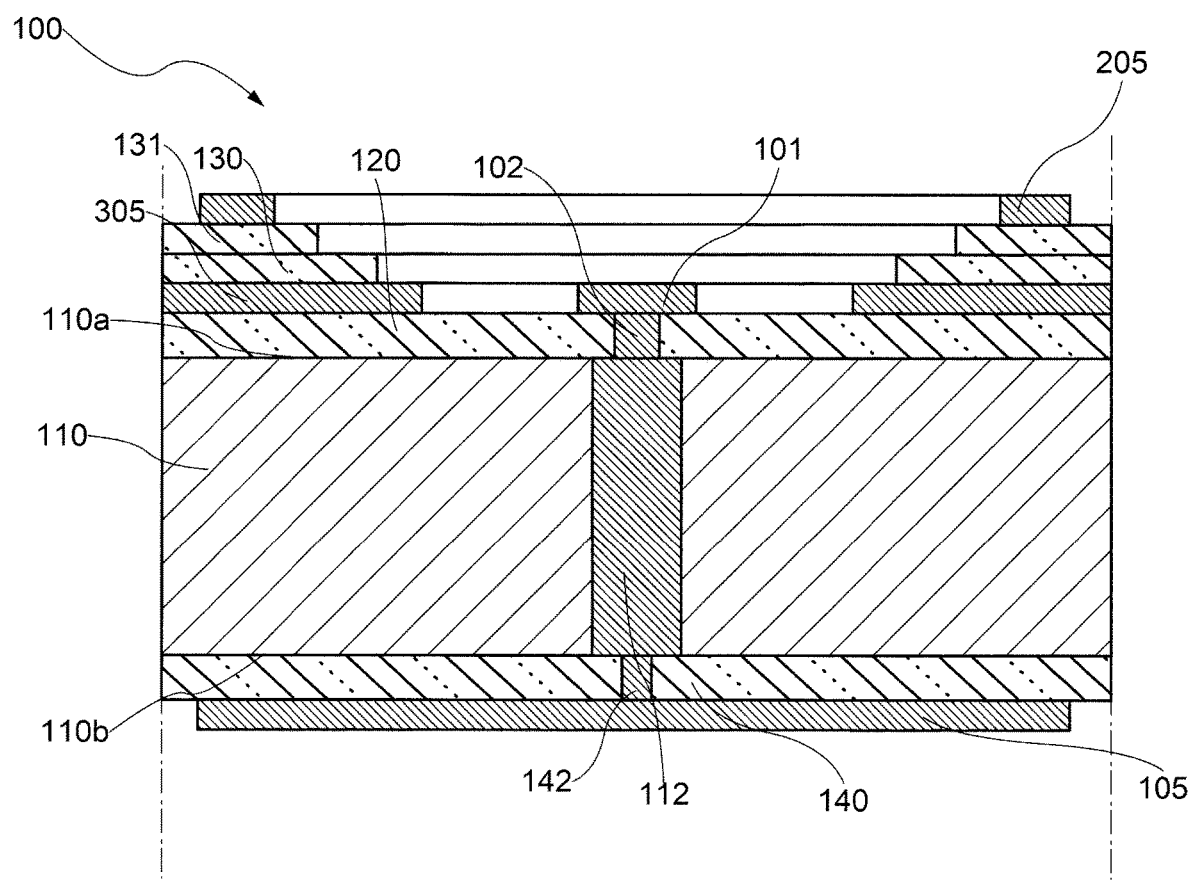
FIG. 27 is a modification of the cross-sectional structure of a detection element according to the first embodiment of the present disclosure.

As shown in FIG. 27, in addition to the insulating layer 130, another insulating layer 131 may be provided, and a plurality of insulating layers may be provided between the first cathode electrode pattern 205 and the second cathode electrode pattern 305. The insulating layer 131 may be formed of the same material as the insulating layer 130 or may be formed of a different material from the insulating layer 130. In this case, the side surface of the insulating layer 130 and the side surface of the insulating layer 131 may be provided continuously as in the case of a single layer or may be provided in a stepped shape as shown in FIG. 27.

In the present embodiment, the ground potential (GND) is applied to the first cathode electrode pattern 205 and the second cathode electrode pattern 305 but the present disclosure is not limited thereto. For example, the potential applied to the first cathode electrode pattern 205 and the potential applied to the second cathode electrode pattern 305 may be different. The applied potential may vary depending on the distance from the anode electrode 101. For example, since the first cathode electrode pattern 205 is apart from the anode electrode 101 than the second cathode electrode pattern 305, −100V may be applied to the first cathode electrode pattern 205, and 0V may be applied to the second cathode electrode pattern 305. In this case, when 500V is applied to the anode electrode 101, the potential difference between the anode electrode 101 and the first cathode electrode pattern 205 becomes larger than the potential difference between the anode electrode 101 and the second cathode electrode pattern 305. Thus, the electric field strength between the anode electrode 101 and the first cathode electrode pattern 205 is greater than the electric field strength between the anode electrode 101 and the second cathode electrode pattern 305. Therefore, even away from the anode electrode 101, it is possible to sufficiently detect the signal in the first cathode electrode pattern 205.

Second Embodiment

In the second embodiment, a detection element in which an insulating layer is formed on the anode electrode pattern 105 will be described.

Figure 28:
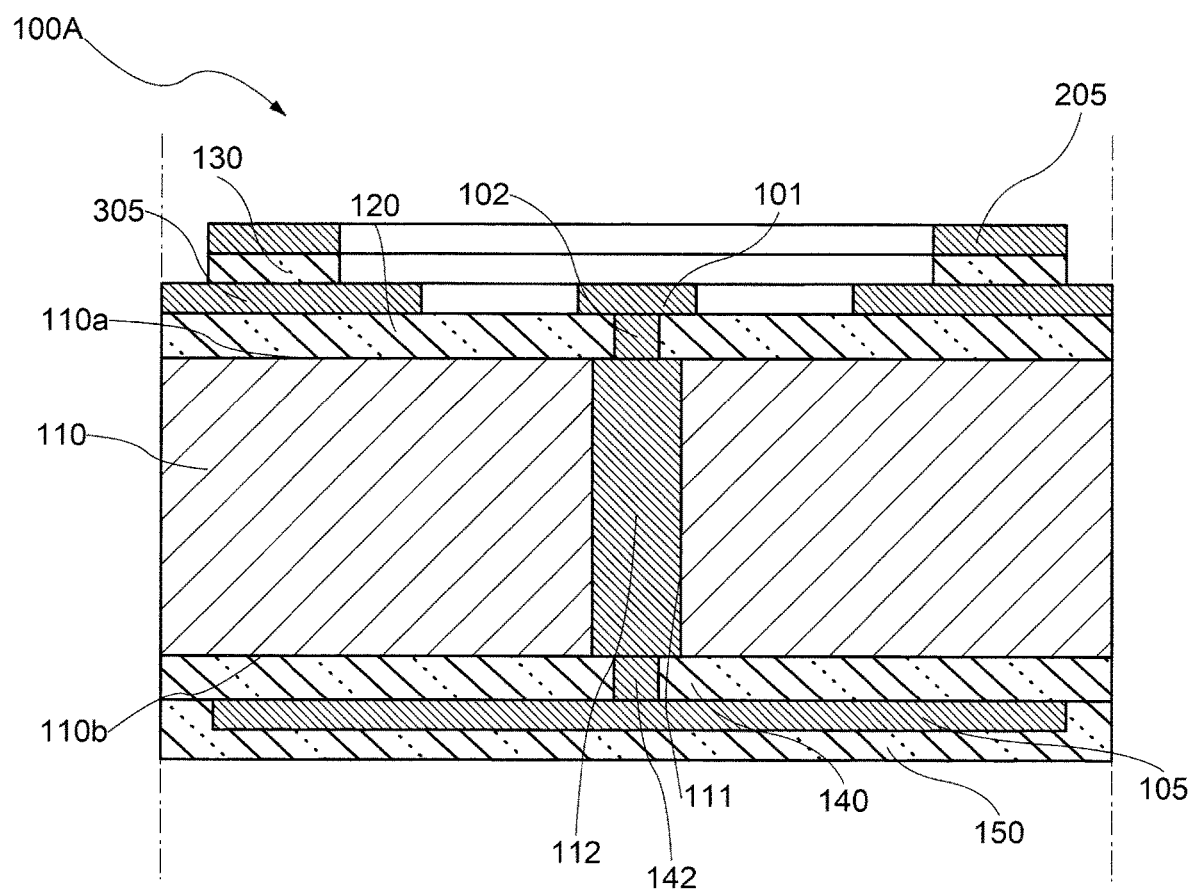
FIG. 28 is a schematic view of a cross-sectional structure of a detection element according to the second embodiment of the present disclosure.

FIG. 28 is a schematic cross-sectional view of a detection element 100A. As shown in FIG. 28, unlike the detection element 100 shown in the first embodiment, the detection element 100A further includes an insulating layer 150 on the substrate 110 and the anode electrode pattern 105. The insulating layer 150 is provided with an inorganic insulating material or an organic insulating material. The thickness of the insulating layer 150 is 1 μm or more and less than 100 μm, preferably 10 μm or more and less than 30 μm. In this example, the thickness of the insulating layer 150 is 20 μm. By providing the insulating layer 150, it is possible to suppress the warp of the substrate 110 caused when manufacturing the detection element 100. When forming the insulating layer 150, it is desirable to form the insulating layer 150 after forming the insulating layer 140 and the anode electrode pattern 105, then the respective elements on the first surface 110a side.

Third Embodiment

In the first embodiment, an example in which a glass substrate is used as the insulating substrate is shown, but in the present embodiment, an example in which a material different from the glass substrate is used is shown.

The substrate 110 may be made of a semiconductor substrate such as a silicone substrate, an inorganic insulating material such as a sapphire substrate, an aluminum oxide ($Al_2O_3$) substrate, an aluminum nitride (AlN) substrate, or a zirconia ($ZrO_2$) substrate, or a resin substrate containing acrylics, polycarbonates or the like, or a lamination of these substrates in addition to the glass substrate.

Figure 29:
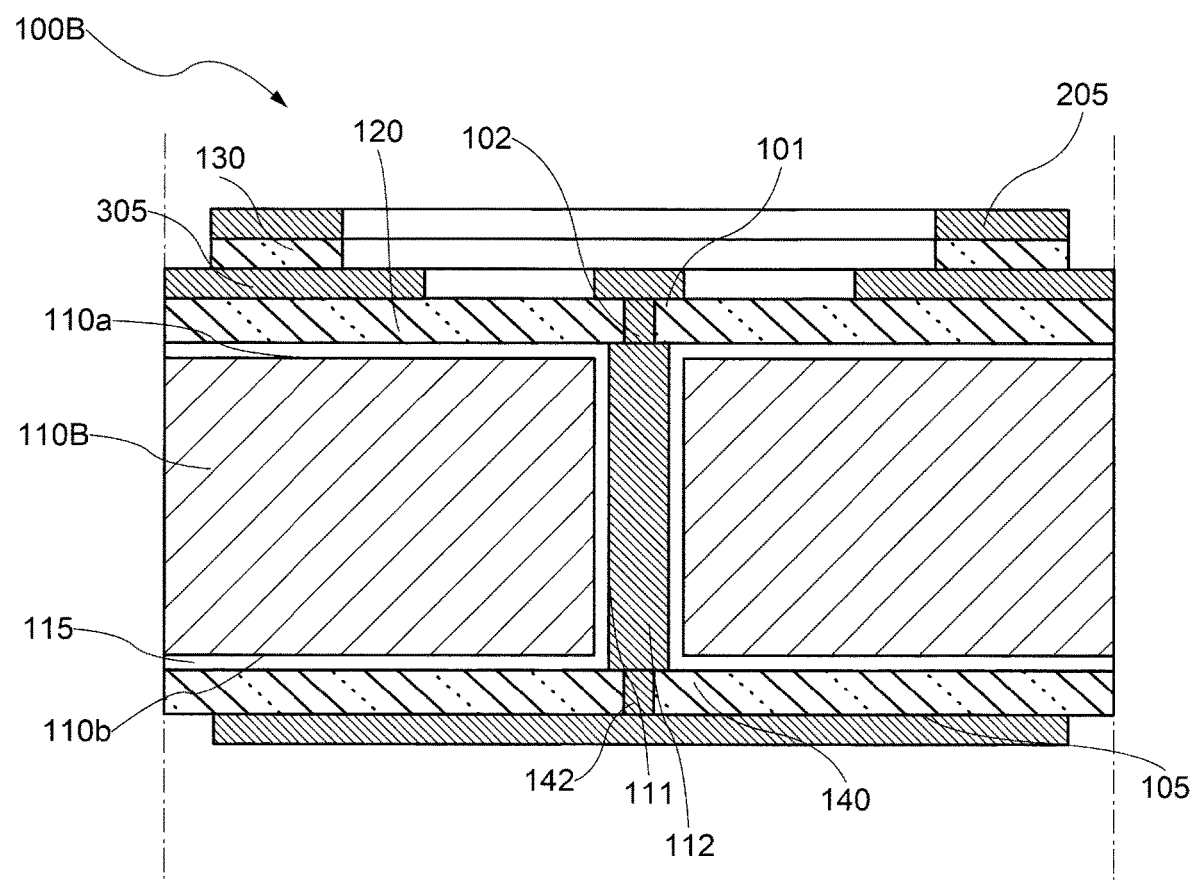
FIG. 29 is a schematic view of a cross-sectional structure of a detection element according to the third embodiment of the present disclosure.
Figure 30:
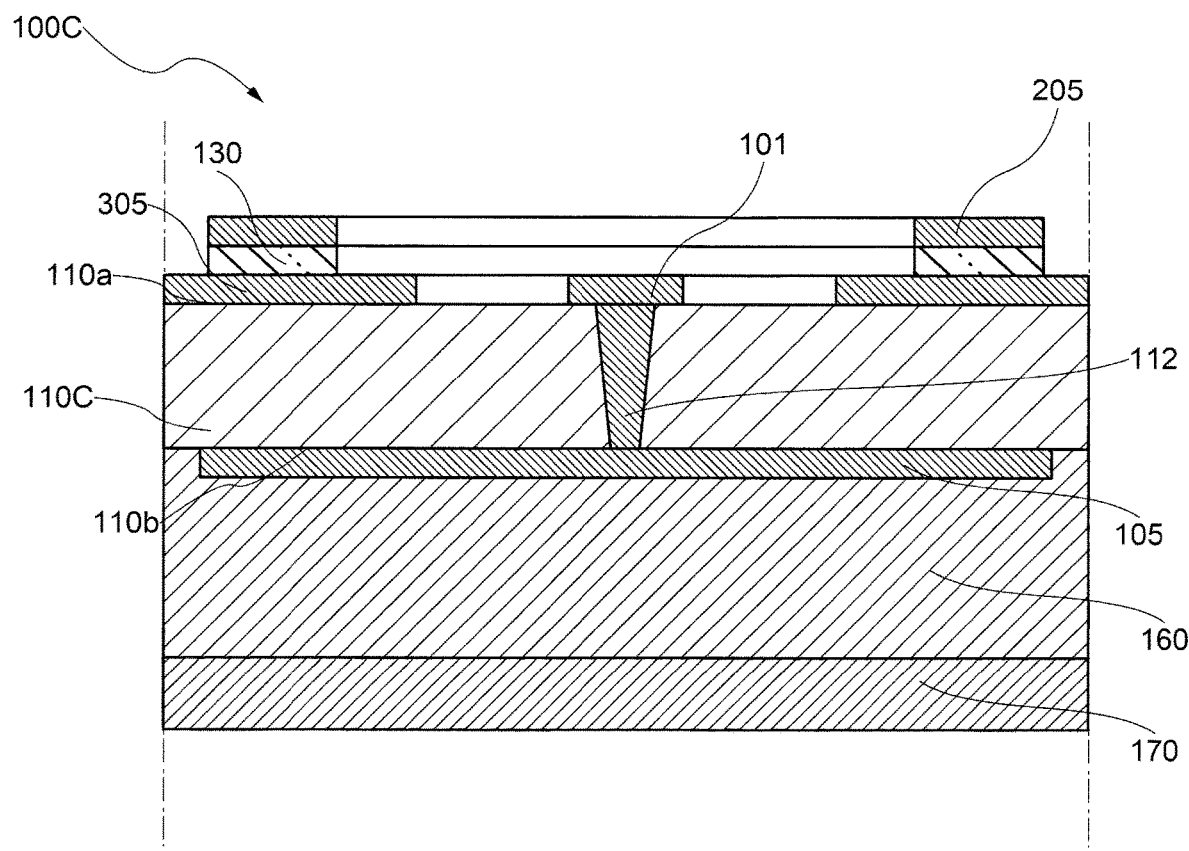
FIG. 30 is a schematic view of a cross-sectional structure of a detection element according to the third embodiment of the present disclosure.

FIG. 29 is a cross-sectional schematic view of a detection element 100B using a silicon substrate to a substrate 110B. As shown in FIG. 29, when a silicon substrate is used for the substrate 110B, an insulating layer 115 is provided on the substrate 110B. The insulating layer 115 may be a thermal oxide film, or may be formed of an insulating material such as a silicon nitride film ($SiN_x$) or a silicon oxide film ($SiO_x$) using a coating method and CVD method or a sputtering method. Therefore, combining the silicon substrate and the insulating layer 115 can be used as a substrate having an insulating surface, so that no leakage current through substrate FIG. 30 is a schematic cross-sectional view of a detection element 100C using an organic resin as a substrate 110C. In FIG. 30, a polyimide resin or an epoxy resin containing glass fibers for increasing strength is used for the substrate 110C. On the other hand, when an organic resin such as a polyimide resin or an epoxy resin is used, it needs to be thick enough to prevent the substrate from flexing. However, the substrate 110C is limited in the thickness due to forming the through electrode 112. Therefore, it is desirable to provide additional substrates 160 and 170 on the anode electrode pattern 105. As a result, the strength of the detection element 100C can be maintained. For the substrate 160 and the substrate 170, a polyimide resin containing glass fibers is used.

Figure 31:
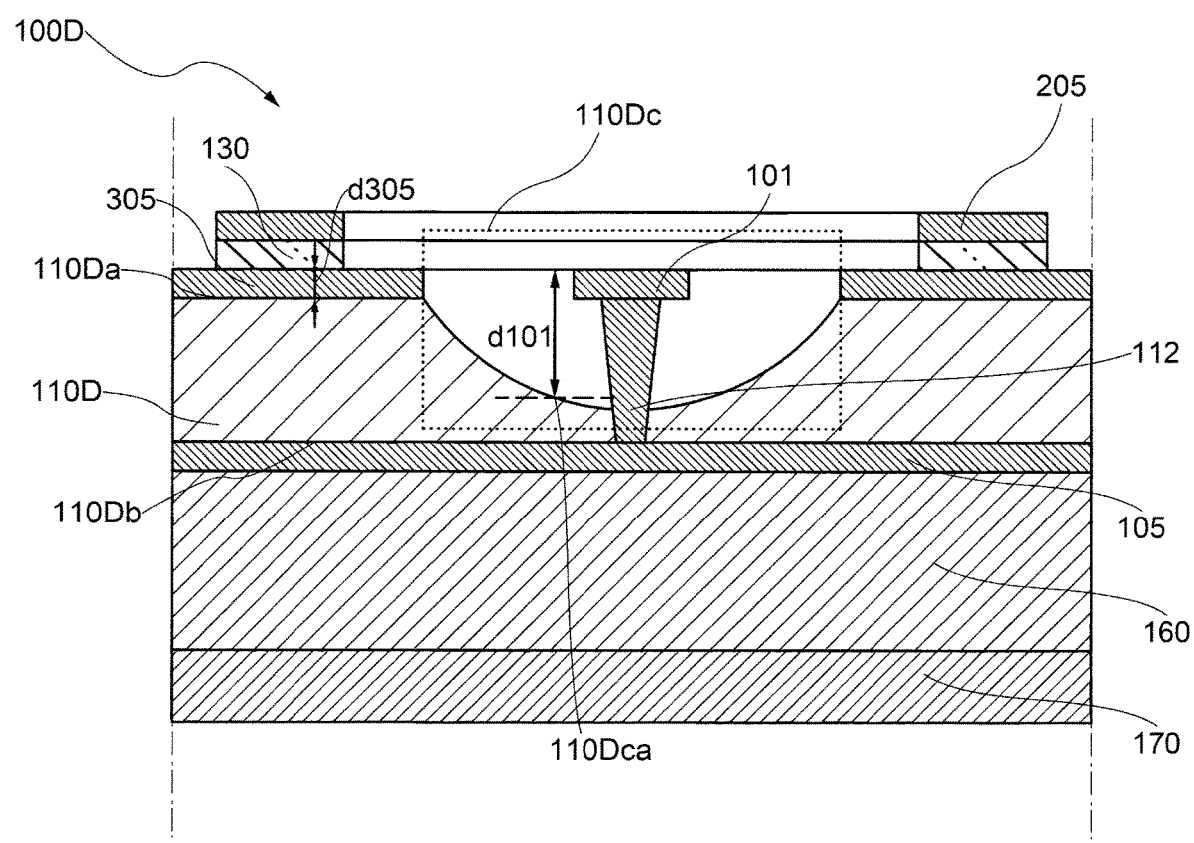
FIG. 31 is a schematic view of a cross-sectional structure of a detection element according to the third embodiment of the present disclosure.

If the strength of the sensing device 100 is maintained by the substrate 160 and the substrate 170, the strength may not be maintained by the substrate 110C. In this case, a polyimide resin containing no glass fibers may be used for the substrate 110C. By not including glass fibers, the substrate 110C can be easily processed. FIG. 31 is a schematic cross-sectional view of a detection element 100D. As shown in FIG. 31, a recess 110Dc may be provided by scraping the surface of a substrate 110D. In this case, a distance d101 from the surface of the recess 110Dc to an upper surface 101a of the anode electrode 101 is larger than a distance d305 from a first surface 110Da of the substrate 110D to the upper surface of the second cathode electrode pattern 305. By having the recess 110Dc, a portion of the through electrode 112 is exposed, and it is possible to expand the exposed area of the entire anode electrode together with the anode electrode 101. As a result, the electric field can be widened, and the detection sensitivity of the radiation can be enhanced.

Fourth Embodiment

In the present embodiment, an example of the detection element in which the exposed portion of the first cathode electrode pattern and the second cathode electrode pattern, and the anode electrode are provided in the same layer is shown.

Figure 32:
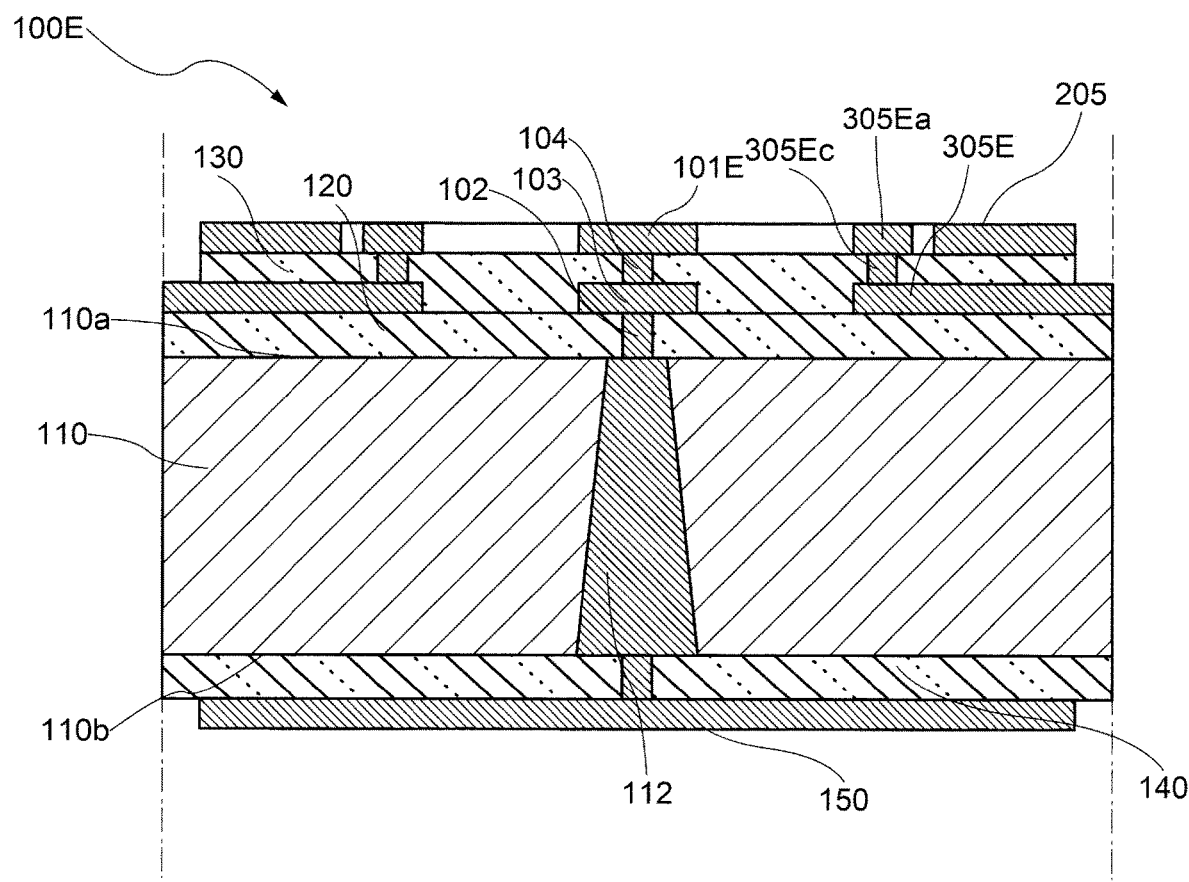
FIG. 32 is a schematic view of a cross-sectional structure of a detection element according to the fourth embodiment of the present disclosure.

FIG. 32 is a schematic cross-sectional view of a detection element 100E. As shown in FIG. 32, in the detection device 100E, an exposed portion 305Ea of a second cathode electrode pattern 305E is provided on a via electrode portion 305Ec, and exposed and provided on the same layer (in this example, on the insulating layer 130) as the first cathode electrode pattern 205. Similarly, the anode electrode 101E is exposed and provided to the same layer as the first cathode electrode pattern 205 through an electrode 103 and a via electrode 104. By having the above configuration, the distance from the drift electrode 80 to the first cathode electrode pattern 205, and the distance from the drift electrode 80 to the second cathode electrode pattern 305 are the same. Thus, it is possible to uniform the rate at which the ionized electrons reach the two cathode electrode patterns. Therefore, the detection sensitivity of the radiation can be improved. In the case of FIG. 32, the anode electrode 101E, the first cathode electrode pattern 205, and the exposed portion 305Ea of the second cathode pattern 305E are formed on the flat insulating surface formed by the insulating layer 130. Therefore, by processing a conductive film formed on the insulating layer 130, the anode electrode 101E, the first cathode electrode pattern 205, and the exposed portion 305Ea of the second cathode electrode pattern 305E can be stably formed.

Fifth Embodiment

In the present embodiment, an example of a detection element in which the shape of the first cathode electrode pattern is different is shown.

Figure 33:
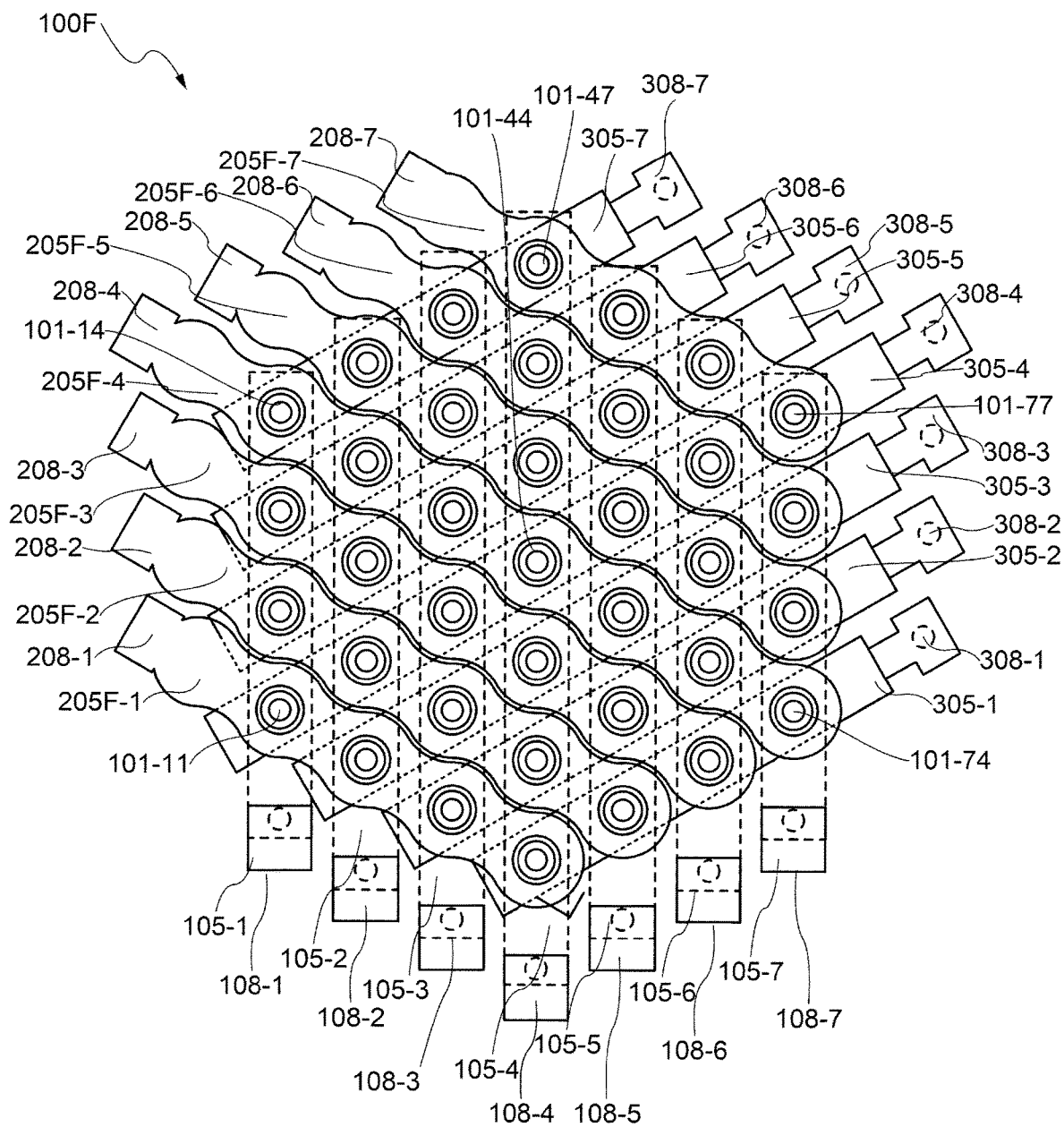
FIG. 33 is a top schematic view illustrating an electrode pattern of a detection element according to the fifth embodiment of the present disclosure.
Figure 33:
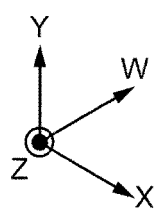
Figure 34:
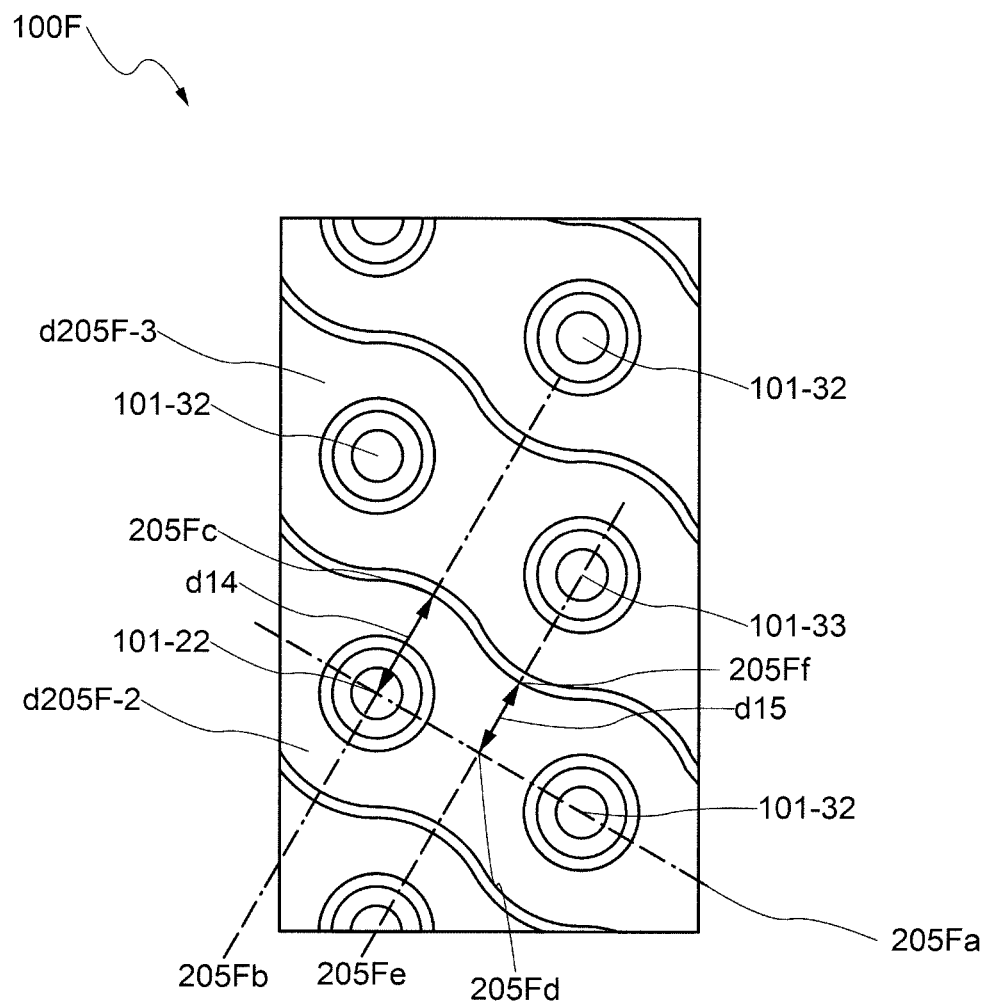
FIG. 34 is an enlarged schematic view of a part of FIG. 33.

FIG. 33 is a schematic top view of a detection element 100F. FIG. 34 is an enlarged schematic view of a part of FIG. 33. As shown in FIGS. 33 and 34, the edge shape of the first cathode electrode pattern 205 of the present embodiment is corrugated and is different from the linear edge of the first cathode electrode pattern 205 shown in the first embodiment. In this example, the edge shape of a first cathode electrode pattern 205F (205F-1 to 205F-7) is streamlined. In this case, as shown in FIG. 34, when a virtual line 205Fa connecting the anode electrode 101-22 and the adjoining anode electrode 101-32 adjacent to the anode electrode 101-22 in the X direction is provided, a point at which a virtual line 205Fb orthogonal to the straight line 205Fa from the center of the anode electrode 101-22 intersects an edge of a first cathode electrode pattern 205F-2 is defined as a point 205Fc. When the point between the anode electrode 101-22 and anode electrode 32 is defined as a midpoint 205Fd, the point at which a virtual line 205Fe orthogonal to the straight line 205Fa from the midpoint 205Fd intersects the edge of the first cathode pattern 205F-2 is defined as a point 205Ff. Assuming that a distance from the center of the anode electrode 101-22 to the point 205Fc is d14, and a distance from the midpoint 205Fd to the point 205Ff is d15, the distance d14 is larger than the distance d15. By having the above shape, since the electric line of force is directed to the first cathode electrode pattern closest to the anode electrode 101, it is possible to further increase the detection accuracy of the radiation.

Figure 35:
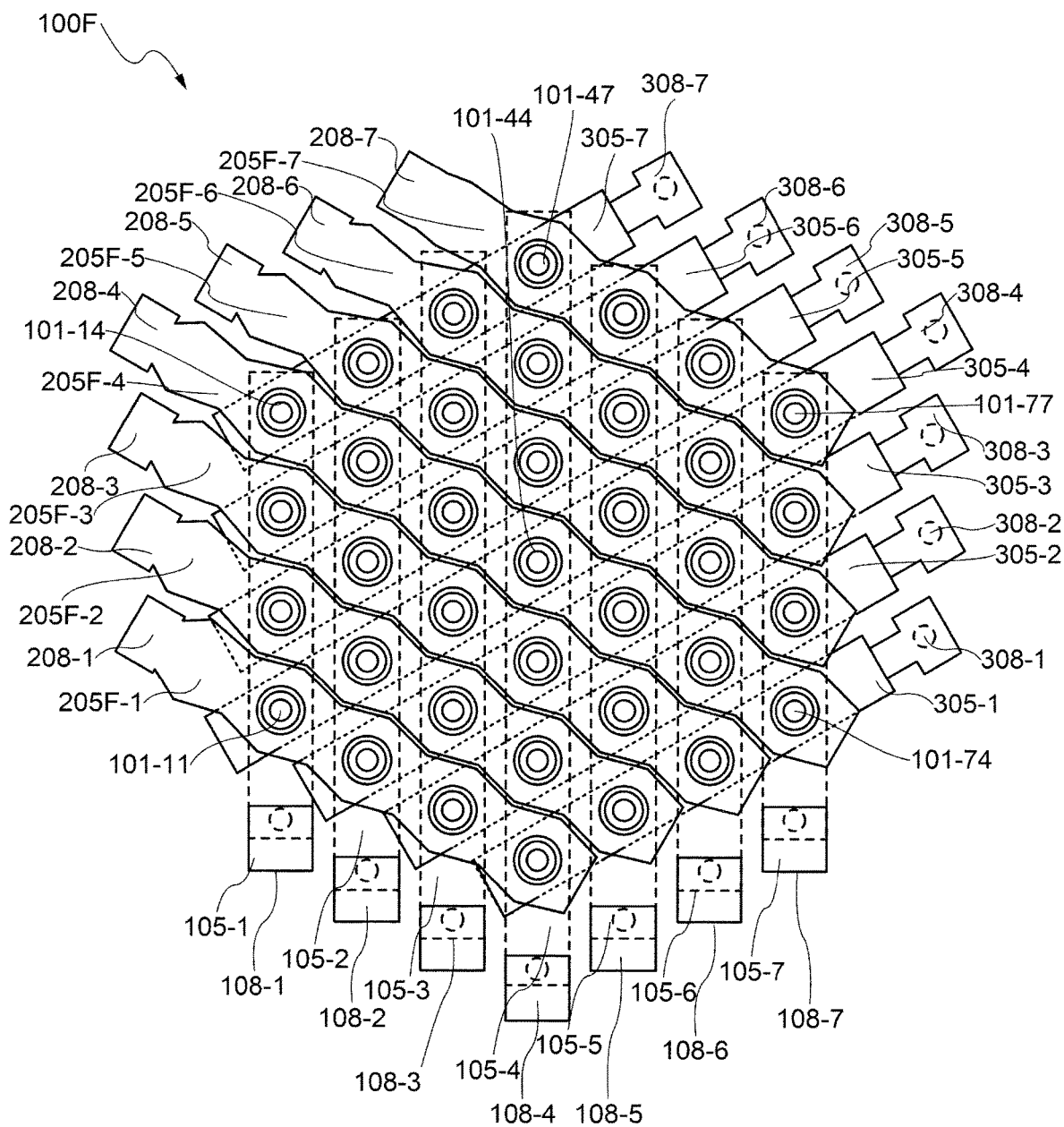
FIG. 35 is a top schematic view illustrating an electrode pattern of a detection element according to the fifth embodiment of the present disclosure.

The shape of the edge of the first cathode electrode pattern 205 is not limited to the streamline. For example, as shown in FIG. 35, the shape of the edge of the first cathode electrode pattern 205 may be zigzag.

Sixth Embodiment

The sixth embodiment differs from the first embodiment in the structure of the second cathode electrode pattern. That is, it is an example of a detection element in which the two adjacent second cathode electrode patterns are connected to constitute the second cathode electrode pattern having a large linewidth.

Figure 36:
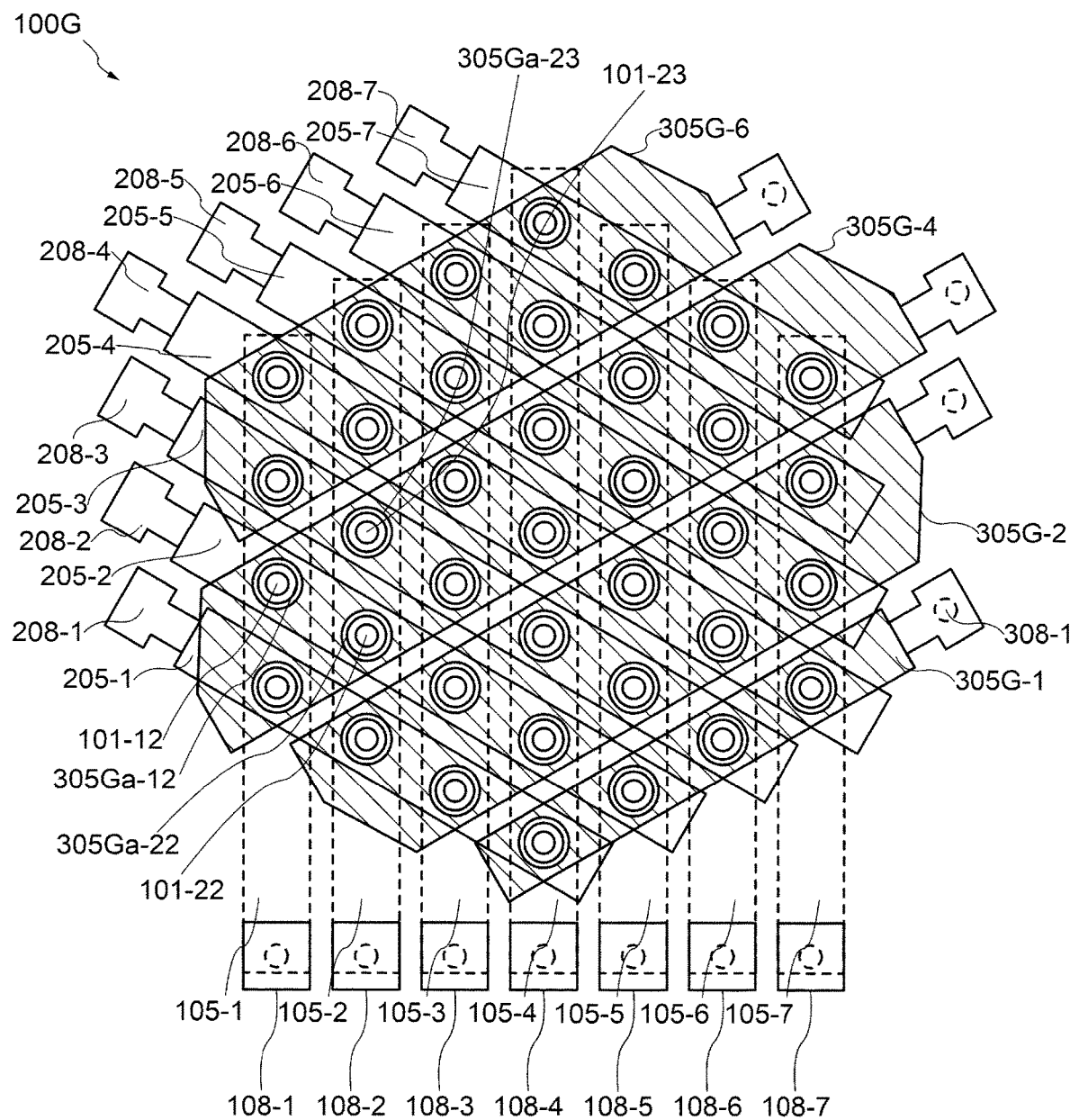
FIG. 36 is a top schematic view illustrating an electrode pattern of a detection element according to the sixth embodiment of the present disclosure.

FIG. 36 is a diagram illustrating the second cathode electrode pattern of the detection element. In the detection element 100 of the first embodiment, the plurality of the anode electrodes 101 corresponding to the one second cathode electrode pattern 305 are connected to the different anode electrode pattern 105 from each other. The plurality of the anode electrodes 101 corresponding to the one second cathode electrode pattern 305 are in correspondence with the first cathode electrode pattern 205 different from each other. On the other hand, in a detection element 100G of the present embodiment, as shown in FIG. 36, the plurality of anode electrodes 101 corresponding to a second cathode electrode pattern 305G in the detection element 100B includes the two anode electrodes 101 connected to the same anode electrode pattern 105 and the two anode electrodes 101 corresponding to the same first cathode electrode pattern 205. In this example, a second cathode electrode pattern 305G-4 includes a region (exposed portions 305Ga-12, 305Ga-22, and 305Ga-23) in the anode electrode 101-22 provided in the X direction relative to the anode electrode 101-12 and the anode electrode 101-23 provided in the W direction relative to the anode electrode 101-12. In the second cathode electrode pattern 305G-4, the exposed portions 305Ga-12, 305Ga-22, and 305Ga-23 are electrically connected to each other.

Figure 37:
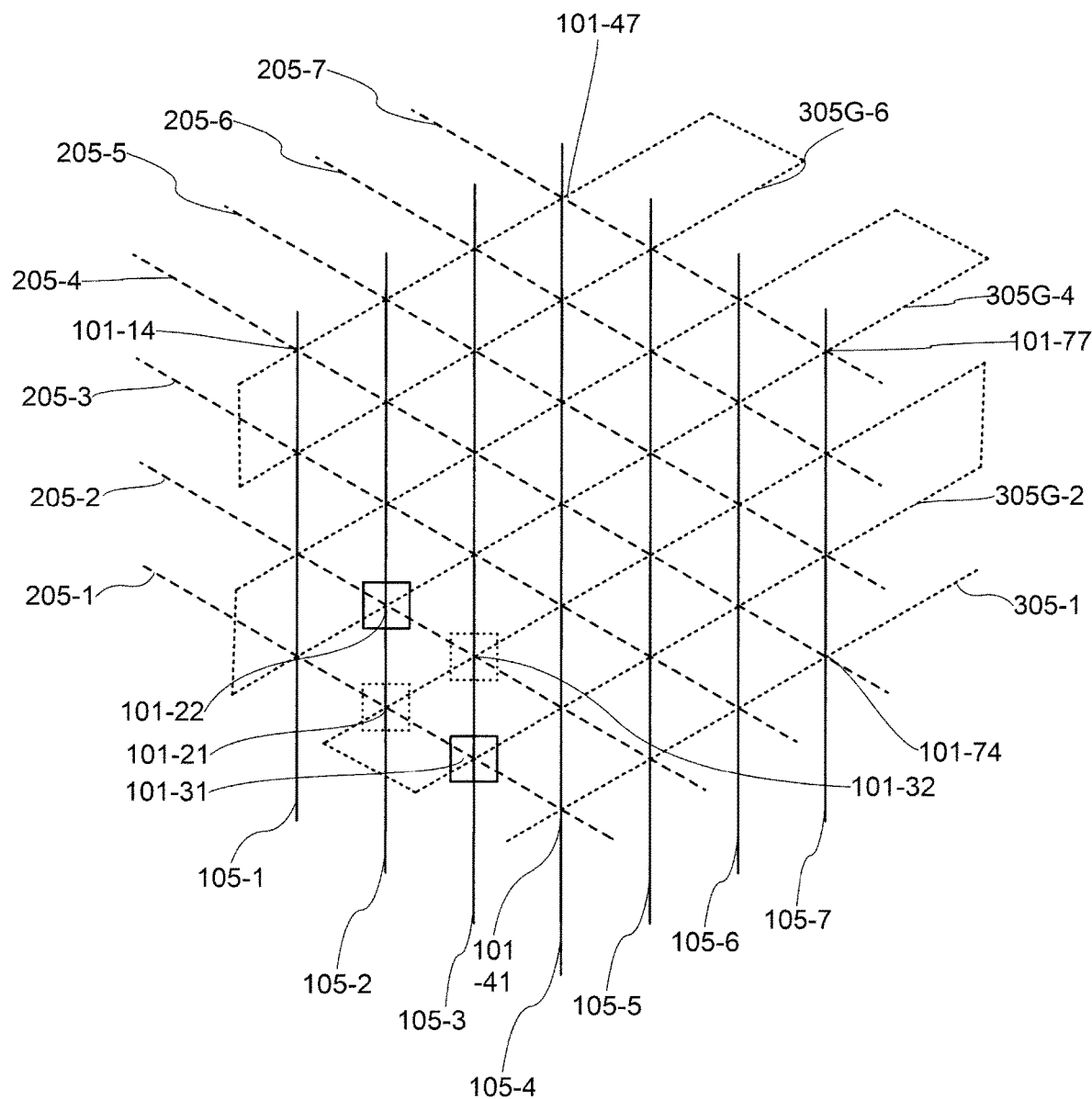
FIG. 37 is a schematic view illustrating an electron capture position calculated from a pattern of a detection signal according to the sixth embodiment of the present disclosure.

For example, the second cathode electrode patterns 305-2 and 305-3 in the first embodiment are electrically connected as a second cathode electrode pattern 305G-2 in the present embodiment. A state in which the electrons are simultaneously captured in the anode electrode 101-22 (pixel (22)) and the anode electrode 101-31 (pixel (31)) is shown referring to FIG. 37. First, when using the detection signals Sx, Sy, the portion where the anode electrode patterns 105-2, 105-3, and the first cathode electrode patterns 205-1, 205-2 intersect is the anode electrodes 101-21, 101-22, 101-31, 101-32 (pixels (21), (22), (31), (32)). Therefore, for the anode electrodes 101-21, 101-32 (pixels (21), (32)) in which no electrons are actually captured, it is a false detection.

On the other hand, when using the detection signals Sx, Sy, Sw, from the portion where the anode electrode patterns 105-2, 105-3, the first cathode electrode patterns 205-1, 205-2 and the second cathode electrode patterns 305G-2 and 305G-4 intersect, it is possible to identify the anode electrodes 101-22, 101-31 (pixels (22), (31)) and the detected location.

When electrons are simultaneously captured by the anode electrode 101-21 (pixel 21) and the anode electrode 101-32 (pixel 32), only the second cathode pattern 305G-2 can be detected as the intersecting portion. Even in the case of the detection element in which the two adjacent second cathode electrode patterns are connected to constitute the second cathode electrode pattern having a large line width, it is possible to prevent false detection because it can be identified whether one or two second cathode electrode patterns are related.

By reducing the number of second cathode electrode patterns, it is possible to reduce the number of detection signal Sw in the radiation. Therefore, by applying the present embodiment, without reducing the detection resolution, it is possible to reduce the power consumption and the detection cost.

Even when using three types of detection signals Sx, Sy, Sw, it may result in false detection when electrons are captured simultaneously in the three anode electrodes 101. However, the probability that electrons are captured simultaneously in the three anode electrodes 101 is smaller than the probability that electrons are captured simultaneously in the two anode electrodes 101. Therefore, erroneous detection can be reduced, and as a result, detection accuracy of radiation can be improved.

In the present embodiment, although an example in which two adjacent second cathode electrode patterns are connected to constitute the second cathode electrode pattern having a large linewidth is shown, three second cathode electrode patterns may be connected.

Figure 38:
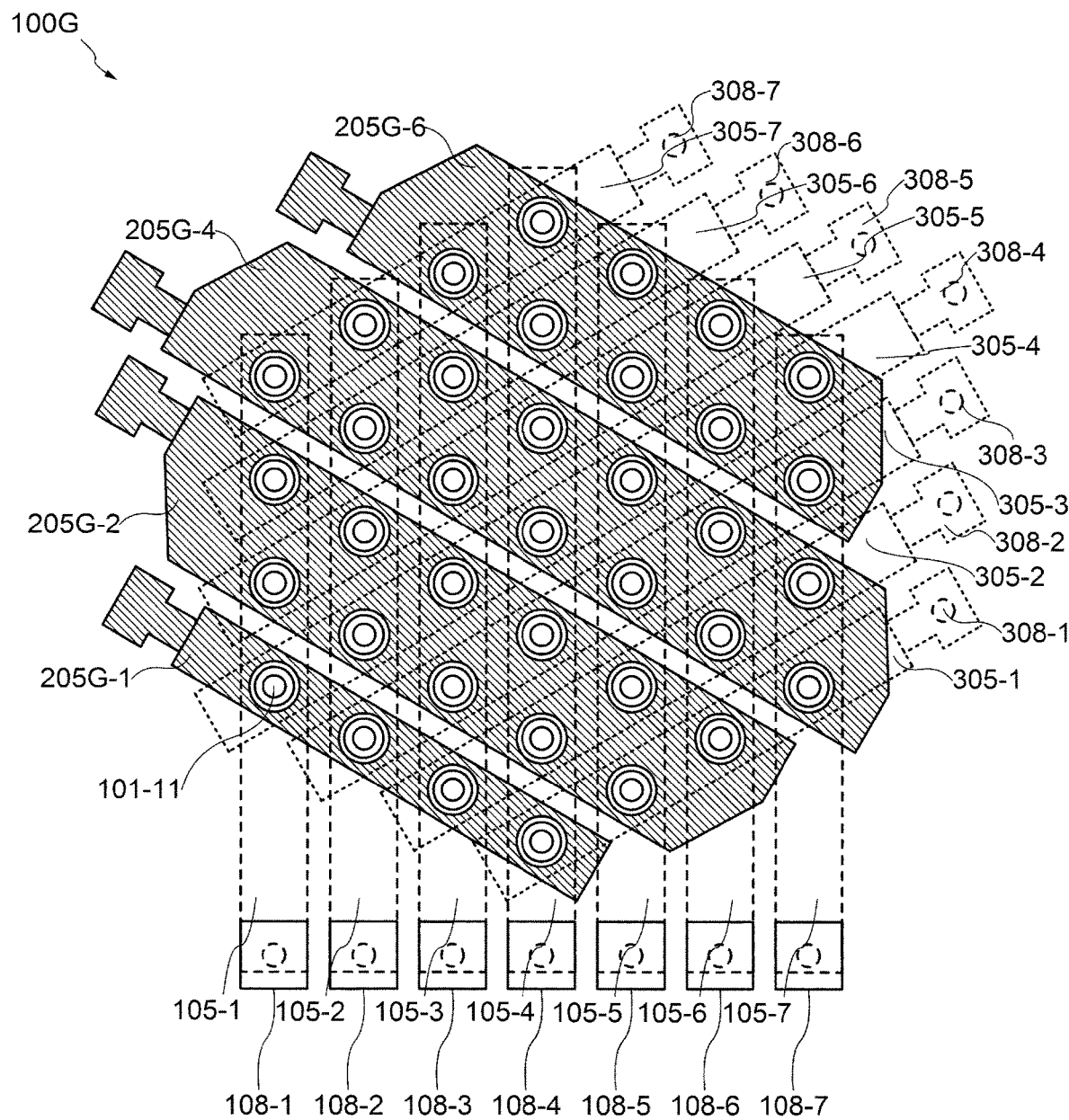
FIG. 38 is a top schematic view illustrating an electrode pattern of a detection element according to the sixth embodiment of the present disclosure.

It is not limited to the adjacent second cathode electrode patterns, the adjacent first cathode electrode patterns may be connected similarly. In FIG. 38, for example, the first cathode electrode pattern 205-2 and the first cathode electrode pattern 205-3 in the first embodiment are connected to each other, and a first cathode electrode pattern 205G-2 is provided. In FIG. 38, since an area of the first cathode patterns is increased, an electric field can be formed in a wide area, and ions can be more easily absorbed when detecting the radiation. Further, it is possible to prevent the insulating layers 120 and the insulating layers 130 being charged. Therefore, by using the detection element of the present embodiment, radiation can be stably detected.

Figure 39:
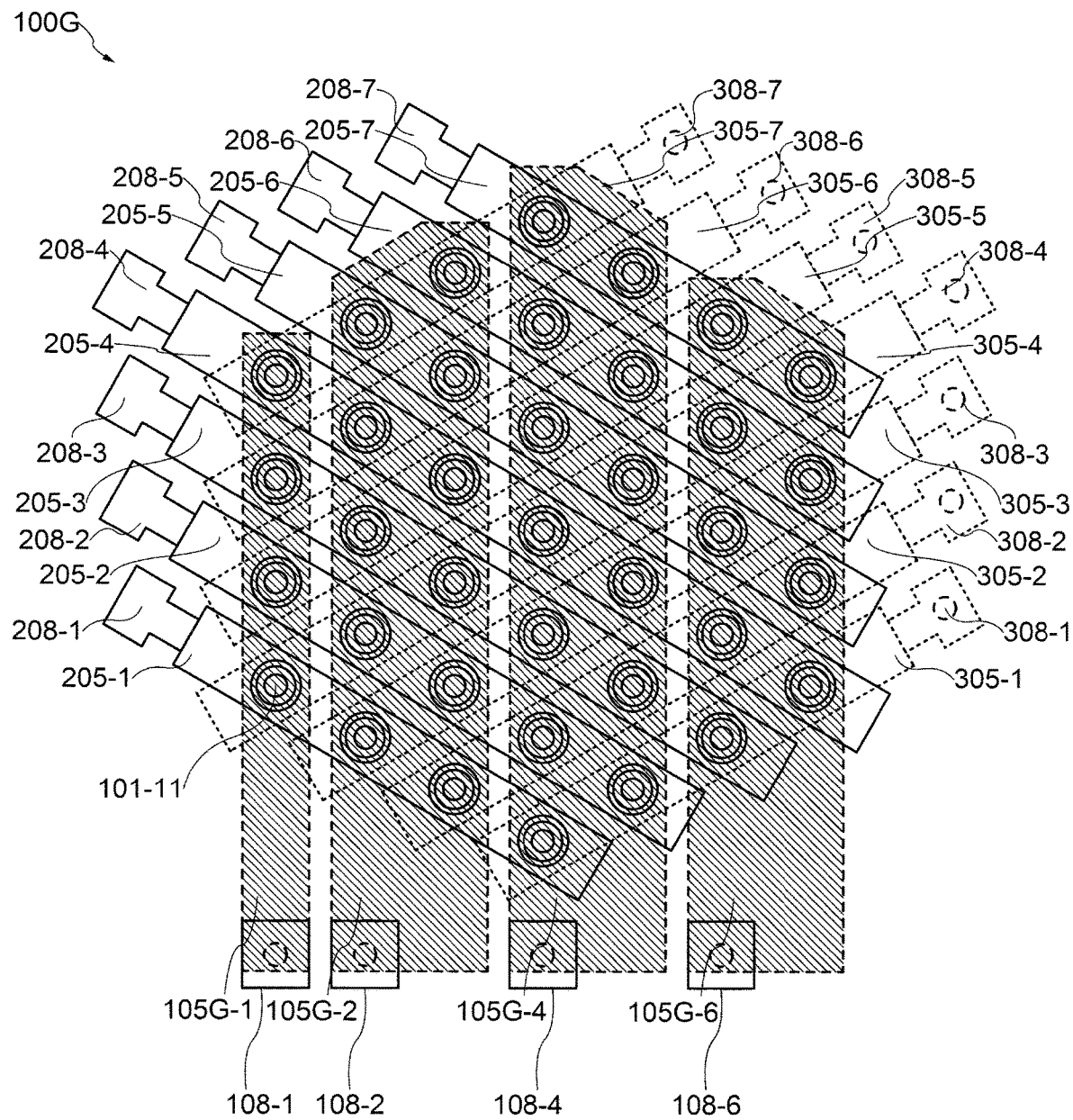
FIG. 39 is a top schematic view illustrating an electrode pattern of a detection element according to the sixth embodiment of the present disclosure.

As shown in FIG. 39, the adjacent anode electrode patterns may be connected. In this example, the anode electrode pattern 105-2 and the anode electrode pattern 105-3 of the first embodiment are connected to each other, and the anode electrode pattern 105G-2 is provided.

Seventh Embodiment

In the present embodiment, an example of a detection element in which the arrangement of the anode electrode, and the shape of the second cathode electrode pattern are different will be described.

Figure 40:
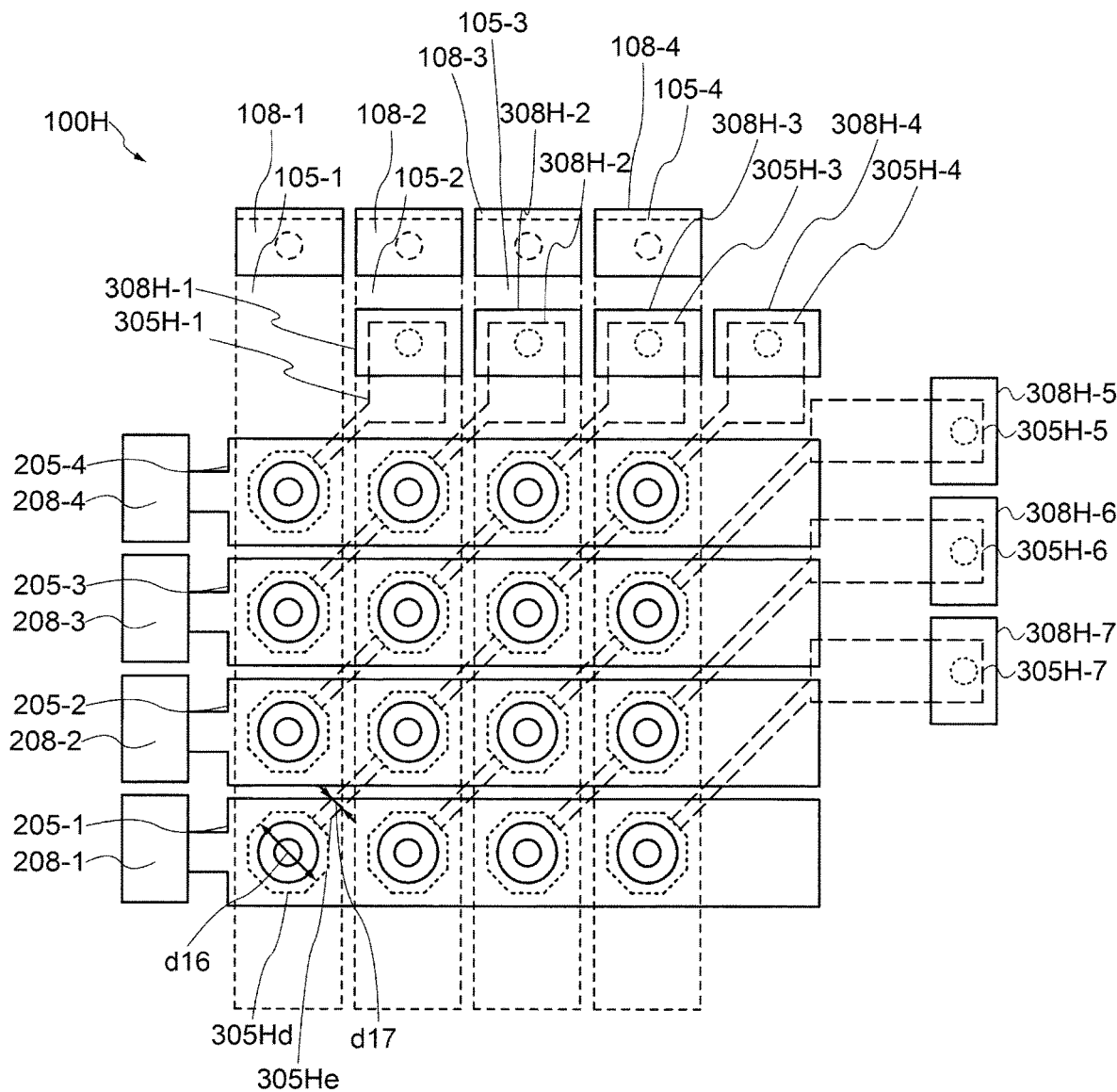
FIG. 40 is a top schematic view illustrating an electrode pattern of a detection element according to the seventh embodiment of the present disclosure.

FIG. 40 is a schematic top view of a detection element 100H. As shown in FIG. 40, in the present embodiment, unlike the arrangement of the anode electrode 101 of the first embodiment, has a configuration in which the X direction and the Y direction are provided orthogonally (90 degrees). In this case, the W direction indicates a direction along a line intersecting at 45 degrees relative to any of the straight line extending in the X direction and the straight line extending in the Y direction.

In FIG. 40, a second cathode electrode pattern 305H (305H-1 to 305H-7) includes an annular pattern 305Hd and a linear connection pattern 305He connecting the adjacent annular pattern. The annular pattern 305Hd is substantially the same as the exposed portion 305a of the first embodiment. In the second cathode electrode pattern 305H, it is preferable that a width d16 (equivalent to the diameter of the opening 202) of the outer periphery of the annular pattern 305Hd is larger than a width d17 of the connection pattern 305He. Thus, even if a large arrangement of the annular pattern, it is possible to prevent contact with the adjacent second cathode electrode pattern 305.

In the present embodiment, the connection pattern has a linear shape, but the present disclosure is not limited thereto. As shown in the fifth embodiment, the connection pattern may be a wavy shape. Thus, it is possible to suppress the crosstalk noise between the first cathode electrode pattern 205.

Eighth Embodiment

In the present embodiment, an example of a detection element having a third cathode electrode pattern will be described.

Figure 41:
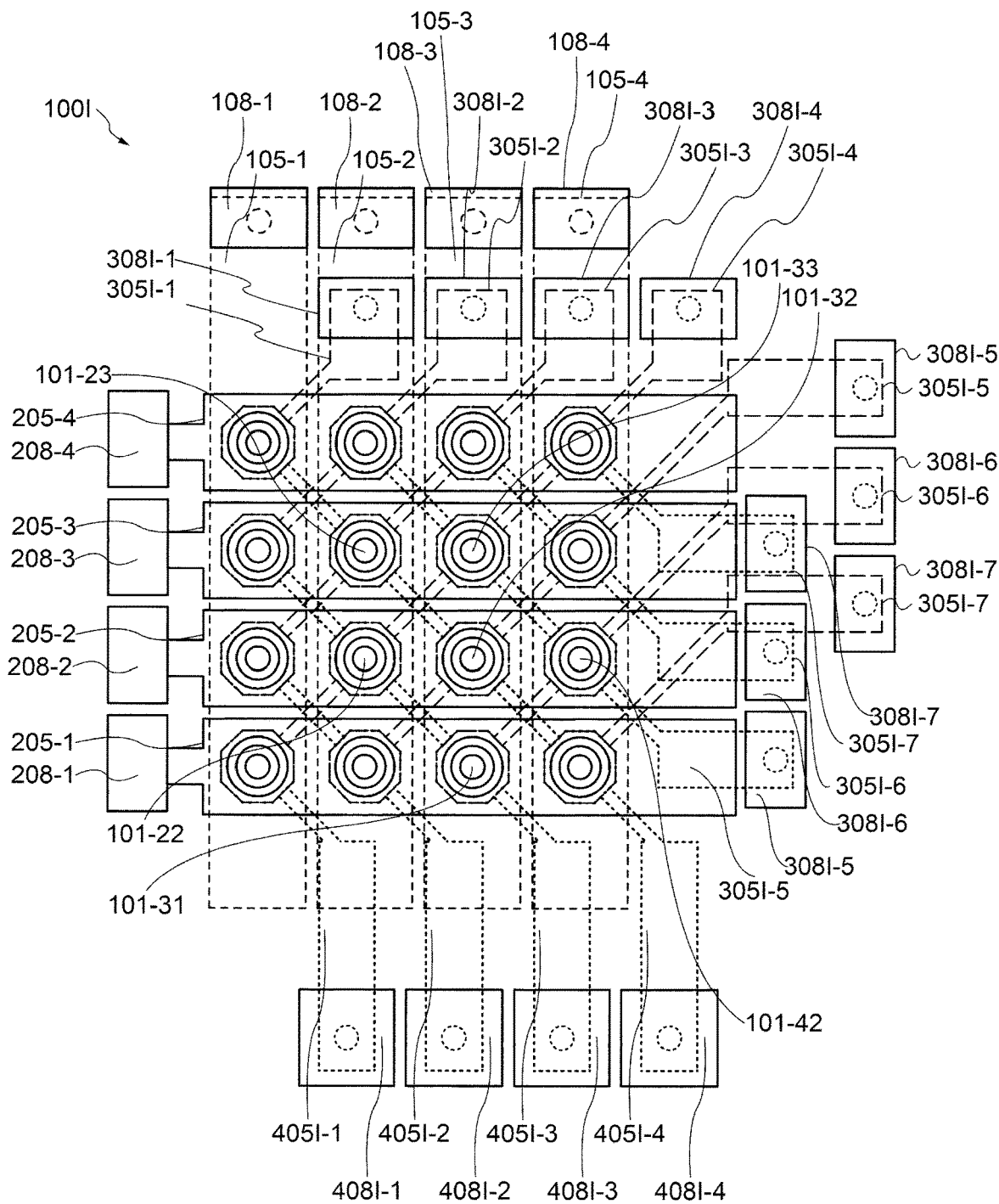
FIG. 41 is a top schematic view illustrating an electrode pattern of a detection element according to the eighth embodiment of the present disclosure.
Figure 41:
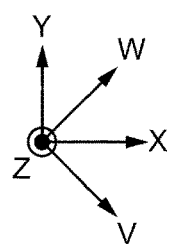

FIG. 41 is a schematic top view of a detection element 100I. FIG. 41 is a schematic cross-sectional view of a part of the detection element 100I. As shown in FIG. 41, the detection element 100I has a third cathode electrode pattern 4051 in addition to the anode electrode 101, the anode electrode pattern 105, the first cathode electrode pattern 205, and a second cathode electrode pattern 305I. In the detection element 100I, the anode electrode 101 and the first cathode pattern 205 are provided perpendicular to each other. The second cathode electrode pattern 305I is provided along the W direction. For example, the second cathode electrode pattern 305I-4 is provided along the W-direction corresponding to the anode electrode 101-22 and the anode electrode 101-33. The third cathode electrode pattern 4051 (4051-1 to 4051-7) is provided along the V direction, which is a direction orthogonal to the W direction. The third cathode pattern 4051-3 is provided along the V-direction corresponding to an anode electrode 100-23 and the anode electrode 101-32. The third cathode pattern 4051 is electrically connected to a third cathode terminal 4081.

Figure 42:
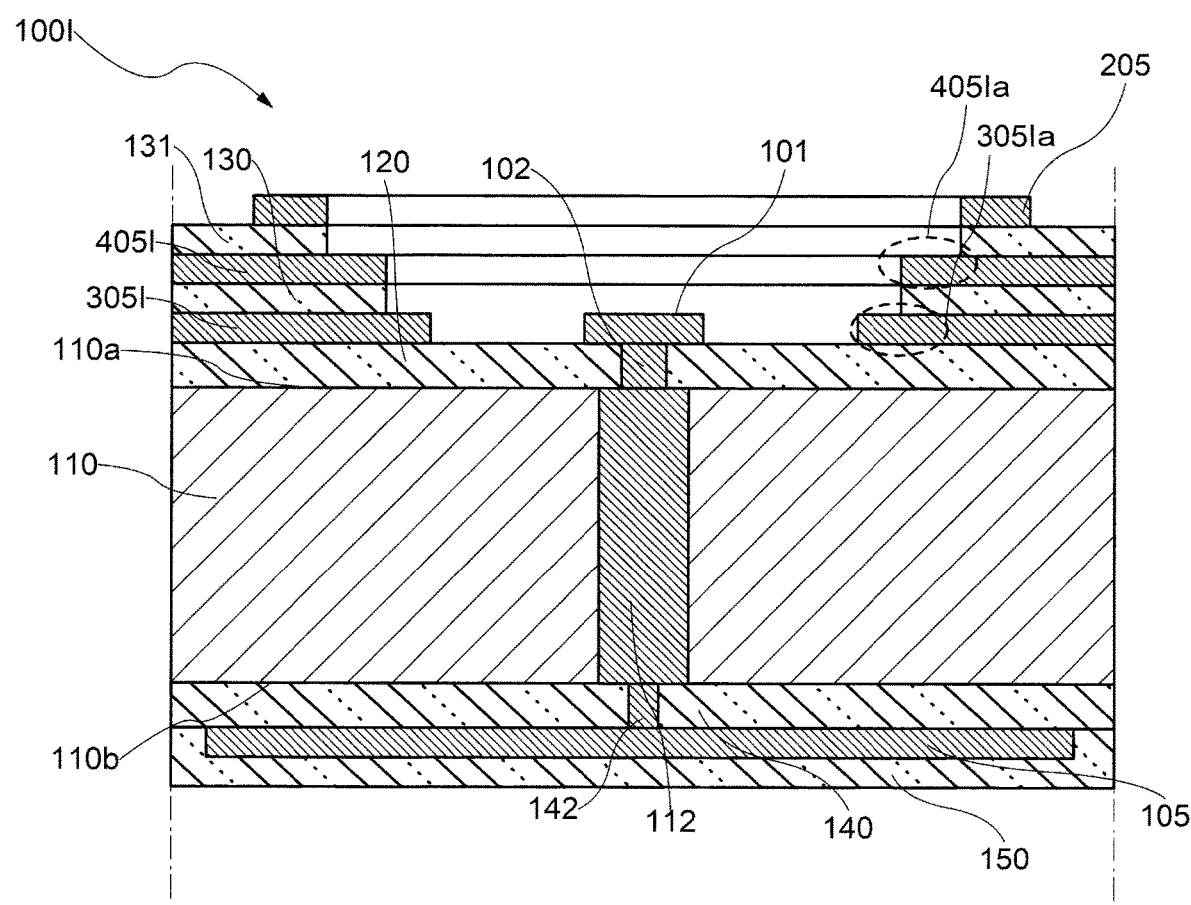
FIG. 42 is a cross-sectional schematic view illustrating a structure of a detection element according to the eighth embodiment of the present disclosure.

As shown in FIG. 42, the third cathode electrode pattern 4051 includes a portion sandwiched between the first cathode electrode pattern 205 and the second cathode electrode pattern 305I. In this example, the third cathode electrode pattern 4051 is sandwiched between the insulating layer 130 on the second cathode electrode pattern 305I and the insulating layer 131 below the first cathode electrode pattern 205. The third cathode electrode pattern 4051 has an exposed portion 4051a. The exposed portion 4051a is exposed on the first surface 110a of the substrate 110 in the same manner as an exposed portion 305Ia. The exposed portion 4051a is provided separately from the anode electrode 101, the first cathode electrode pattern 205, and the second cathode electrode pattern 305I. By using this embodiment, it is possible to improve the detection efficiency of radiation in a high-dose environment in which the possibility of simultaneous detection is high.

In the present embodiment, an example in which the third cathode electrode pattern 4051 (4051-1 to 4051-7) is provided along the V direction, which is a direction orthogonal to the W direction, is shown, but the present disclosure is not limited thereto. The third electrode cathode pattern 4051 may be provided in a direction passing through the anode electrode 101-23 and between the anode electrode 101-22 and the anode electrode 101-33. For example, it may be a direction passing through the anode electrode 101-23 and the anode electrode 101-31, or a direction passing through the anode electrode 101-23 and an anode electrode 101-42.

In the present embodiment, an example in which there are three cathode electrode patterns is shown, but the present disclosure is not limited to this, and four or more cathode electrode patterns may be provided. Thus, it is possible to improve the detection efficiency of radiation in a high-dose environment in which the possibility of simultaneous detection is high.

Specific Configuration Example

Figure 43:
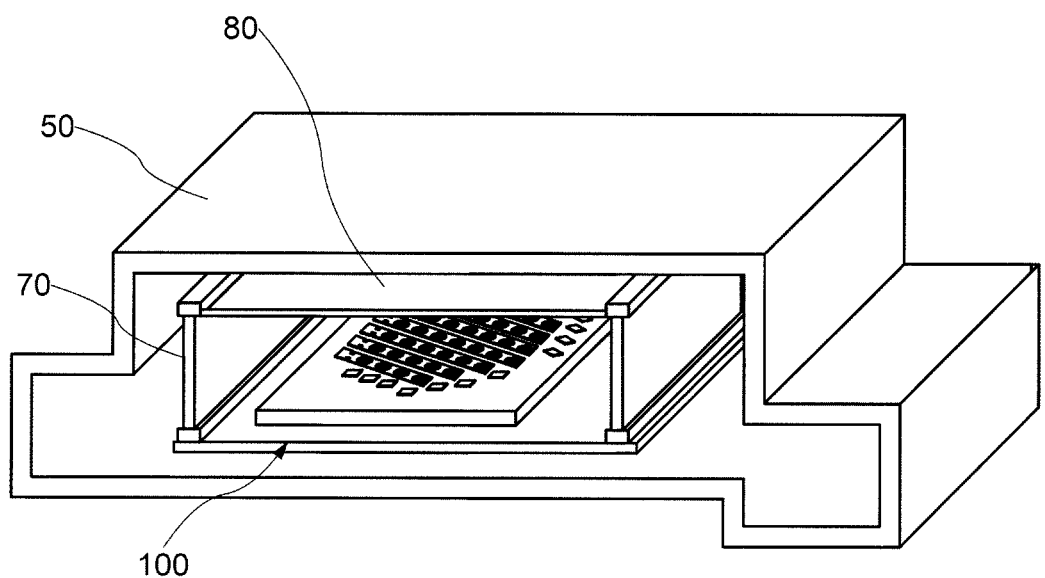
FIG. 43 is a schematic configuration diagram of a radiation detection device equipped with the detection element according to the first to eighth embodiments of the present disclosure.
Figure 44:
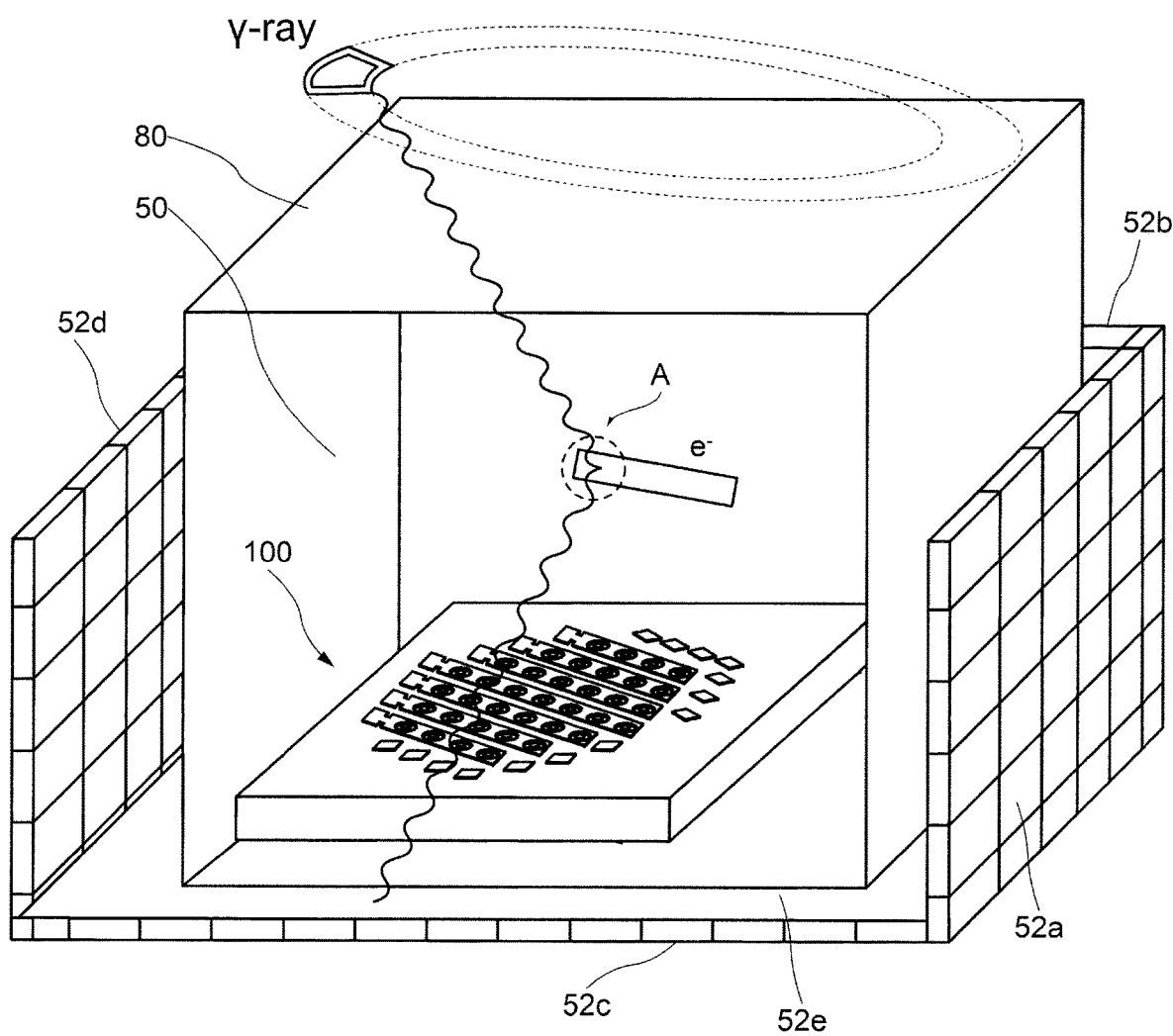
FIG. 44 is a schematic configuration diagram of a compton camera equipped with the radiation detection device according to the first to eighth embodiments of the present disclosure.

The radiation detection device 10 in each of the above embodiments is realized as an example of a specific configuration as shown in FIGS. 43 and 44.

FIG. 43 is a diagram illustrating a specific configuration example of the radiation detection device according to each embodiment of the present disclosure. As described above, the radiation detection device 10 includes a power supply device (not shown) and the chamber 50. The detection element 100 (in the case of the first embodiment), the drift cage 70 and the drift electrode 80 are provided inside the chamber 50. The detection element 100 and the drift electrode 80 are provided to face each other. When detecting radiation, mixed gas of rare gas and quenching gas as described above is filled in the chamber 50.

FIG. 44 is a schematic configuration diagram of a compton camera 20 using the radiation detection device 10. As shown in FIG. 44, a detection module 52 is provided so as to surround the radiation detection device 10 from five directions. In FIG. 44, five detection modules are denoted by reference numerals 52a to 52e, respectively. Although an example of providing the detection module 52 in the five directions, the detection module may be provided at least one direction (e.g., the downward direction of the anode electrode 101).

The principle of the compton camera 200 is as follows. First, when γ-ray is incident on the radiation detection device 10 from the outside, incident γ-ray at a certain probability collides with the gas inside the chamber 50, γ-ray is scattered. A symbol "A" shown in FIG. 44 is a collision position. Scattered γ-ray whose traveling direction has changed due to the collision pass through the radiation detection device 10 and incident on the detection module 52. A light emission occurs when the scattered γ-ray is incident on the detection module 52, this light emission is converted into an electrical signal by a photomultiplier tube or the like. The electrical signal obtained like this is acquired as information indicating the incident position and the time of the scattered γ-ray. In this case, the energy of the scattered γ-ray may be acquired. When acquiring the energy of the scattered γ-ray, by configuring to detect limited to the energy range that is assumed when the γ-ray from a predetermined radiation source are scattered only once in the chamber, it is possible to remove the effect (noise) by the scattered γ-ray which scattered multiple times.

On the other hand, the gas in the chamber 50 colliding with the incident γ-ray emits recoil electrons e⁻ (charged particles) in a predetermined direction from the position of the symbol "A". Then, electron clouds are generated along the tracks of the recoiled electrons. The electrons constituting the electron clouds are attracted to the pixel electrode (the anode electrode 101) by the electric field between the drift electrode 80 and the pixel electrode (the anode electrode 101). In this case, the electronics attracted to the vicinity of the pixel-electrode (the anode electrode 101) collide with the gas, and ionize the gas. Furthermore, electrons generated by ionizing multiply in an avalanche, and are detected by the pixel electrodes (the anode electrode 101). The electric signal obtained in this manner corresponds to the detection signal, which is a signal capable of identifying the position of the pixel at which the electron is detected and the time at which the electron is detected in the pixel.

The distance (position in Z direction) from the pixel electrode (the anode electrode 101) to the position where the electron clouds occurred can be calculated according to the time from when the scattered γ-ray incident on the detection module 52 until the electrons are detected at the pixel electrode (the anode electrode 101).

What is claimed is:

1. A detection element comprising;
a plurality of exposed electrodes exposed on first surface side of an insulating substrate, the plurality of exposed electrodes including a first exposed electrode, a second exposed electrode provided in first direction with respect to the first exposed electrode, a third exposed electrode provided in second direction intersecting the first direction with respect to the first exposed electrode, and a fourth exposed electrode provided in the second direction with respect to the second exposed electrode and in the first direction with respect to the third exposed electrode;
a first electrode pattern provided on second surface side opposite the first surface side of the insulating substrate, the first electrode pattern including at least a first pattern connected to the first exposed electrode and the second exposed electrode by the first through electrode, and a second pattern connected to the third exposed electrode and the fourth exposed electrode by the second through electrode;
a second electrode pattern including a first exposed portion, the second electrode pattern including at least a third pattern provided along the second direction corresponding to the first exposed electrode and the third exposed electrode, and a fourth pattern provided along the second direction corresponding to the second exposed electrode and the fourth exposed electrode, and the first exposed portion exposed on the first surface side and provided in isolation from the exposed electrode; and
a third electrode pattern having a second exposed portion, the third electrode pattern including at least a five pattern provided along the third direction connecting the first exposed electrode and the fourth exposed electrode, and provided so as to sandwich the third electrode pattern between the first electrode pattern and the second electrode pattern, the second exposed portion exposed on the first surface side and provided separately from the exposed electrode and the second electrode pattern.

2. The detection element according to claim 1, wherein the second electrode pattern has a first opening surrounding one of the exposed electrode,
the third electrode pattern has a second opening that surrounds one of the exposed electrode, and
the width of the first opening is greater than the width of the second opening.

3. The detection element according to claim 1, wherein the second exposed portion of the third electrode pattern is provided on the same layer as the second electrode pattern.

4. The detection element according to claim 3, wherein the exposed electrode is provided on the same layer as the second electrode pattern.

5. The detection element according to claim 1, wherein at least one of the first electrode pattern, the second electrode pattern, and the third electrode pattern is electrically connected in an area surrounding the first exposed electrode, the second exposed electrode, and the fourth exposed electrode.

6. The detection element according to claim 1, further comprising;
an insulating layer on the first electrode pattern on the second surface side.

7. The detection element according to claim 1, wherein
the first exposed electrode and the second exposed electrode are provided adjacent to each other,
the first exposed electrode and the third exposed electrode are provided adjacent to each other, and
the first exposed electrode and the fourth exposed electrode are provided adjacent to each other.

8. The detection element according to claim 7, wherein
the distance between the first exposed electrode and the second exposed electrode, the distance between the first exposed electrode and the third exposed electrode, and the distance between the first exposed electrode and the fourth exposed electrode are equal.

9. The detection element according to claim 8, wherein
When a first virtual line connecting the first exposed electrode and the third exposed electrode is provided in the second electrode pattern, a distance between a center of the first exposed electrode and the first intersection point where a second virtual line passing through the center of the first exposed electrode and being orthogonal to the first virtual line intersects an edge of the second electrode pattern is greater than a distance between the midpoint between the first exposed electrode and the third exposed electrode, and the second intersection point where the third virtual line passing through the midpoint and being orthogonal to the first virtual line intersects the edge of the second electrode pattern.

10. The detection element according to claim 9, wherein
the second electrode pattern has a wavy edge.

11. The detection element according to claim 1,
a fourth electrode pattern having a third exposed portion, the fourth electrode pattern is provided along the fourth direction corresponding to the first exposed electrode and the fifth exposed electrode, and includes at least a pattern provided so as to sandwich the fourth electrode pattern between the second electrode pattern and the third electrode pattern,
wherein
the exposed electrode further includes a fifth exposed electrode passes through the second exposed electrode and provided in a fourth direction passing between the first exposed electrode and the fourth exposed electrode, and
the third exposed portion further includes a fourth electrode pattern exposed on the first surface side and provided separately from the exposed electrode, the second electrode pattern, and the third electrode pattern.

12. The detection element according to claim 1, wherein
the third electrode pattern includes a first annular pattern surrounding the first exposed electrode, a second annular pattern surrounding the fourth exposed electrode, and a connection pattern connecting the first annular pattern and the second annular pattern,
a width of the connection pattern is narrower than an outer peripheral width of the first annular pattern and the outer peripheral width of the second annular pattern.

13. The detection element according to claim 1, wherein
the third electrode pattern is provided on an insulating surface,
the insulating surface has a recess,
the exposed electrode is provided in the recess, and
the distance from the surface of the recess to the top surface of the exposed electrode is greater than the distance from the insulating surface to the top surface of the third electrode pattern.

14. A radiation detection device comprising;
the detection element according to claim 1; and
a power supply device connected to the exposed electrode, the first electrode pattern, the second electrode pattern and the third electrode pattern of the detection element.

15. The radiation detection device according to claim 14, wherein
the potential difference between the potential of the exposed electrode and the potential of the second electrode pattern applied by the power supply device is greater than the potential difference between the potential of the exposed electrode and the potential of the third electrode pattern applied by the power supply device.

16. A Compton camera comprising:
the radiation detection device according to claim 14; and
a detection module for detecting light provided so as to surround the radiation detection device.

* * * * *